(12) United States Patent
Kim et al.

(10) Patent No.: US 12,479,734 B2
(45) Date of Patent: Nov. 25, 2025

(54) AEROGEL COMPOSITE

(71) Applicant: LG Chem, Ltd., Seoul (KR)

(72) Inventors: Mi Ri Kim, Daejeon (KR); Hye Kyung Han, Daejeon (KR); Kyung Inn Kim, Daejeon (KR); Min Hwa Shin, Daejeon (KR); Kyoung Shil Oh, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 18/987,296

(22) Filed: Dec. 19, 2024

(65) Prior Publication Data

US 2025/0340444 A1 Nov. 6, 2025

(30) Foreign Application Priority Data

May 2, 2024 (KR) ........................ 10-2024-0058657

(51) Int. Cl.
| | |
|---|---|
| *C01B 33/158* | (2006.01) |
| *C01B 33/143* | (2006.01) |
| *C01B 33/154* | (2006.01) |
| *F16L 59/02* | (2006.01) |
| *H01M 10/658* | (2014.01) |
| *H01M 50/204* | (2021.01) |

(52) U.S. Cl.
CPC ........ *C01B 33/1585* (2013.01); *C01B 33/143* (2013.01); *C01B 33/1546* (2013.01); *F16L 59/028* (2013.01); *H01M 10/658* (2015.04); *H01M 50/204* (2021.01)

(58) Field of Classification Search
None
See application file for complete search history.

(56) References Cited

U.S. PATENT DOCUMENTS

| | | | |
|---|---|---|---|
| 2,734,827 | A | 2/1956 | Hooks |
| 7,560,062 | B2 | 7/2009 | Gould et al. |
| 10,759,666 | B2 | 9/2020 | Hindelang et al. |
| 11,274,044 | B2 * | 3/2022 | Kim ............... C01B 33/158 |
| 11,577,490 | B2 | 2/2023 | Oikawa et al. |
| 2002/0094426 | A1 | 7/2002 | Stepanian et al. |
| 2010/0143717 | A1 | 6/2010 | Sakamoto et al. |
| 2016/0369059 | A1 | 12/2016 | Kotake et al. |
| 2017/0210092 | A1 | 7/2017 | Rikleen et al. |
| 2017/0283269 | A1 | 10/2017 | Kotake et al. |
| 2018/0029892 | A1 | 2/2018 | Yu et al. |
| 2018/0086587 | A1 | 3/2018 | Kim et al. |
| 2018/0134566 | A1 | 5/2018 | Kim et al. |

(Continued)

FOREIGN PATENT DOCUMENTS

| | | |
|---|---|---|
| CN | 101680128 B | 1/2013 |
| CN | 107140938 A | 9/2017 |

(Continued)

OTHER PUBLICATIONS

Klochkov, A. et al., "Pulse NMR of 3He in aerogel at temperature 1.5 K" Open Access, Journal of Physics: Conference Series, 2009, pp. 1-5, vol. 150.

(Continued)

*Primary Examiner* — Michael Forrest
(74) *Attorney, Agent, or Firm* — Lerner David LLP

(57) ABSTRACT

An aerogel composite has excellent thermal stability even when exposed to a high-temperature environment, thereby being capable of maintaining high heat insulation.

13 Claims, 2 Drawing Sheets

(56) References Cited

U.S. PATENT DOCUMENTS

| | | |
|---|---|---|
| 2018/0141821 A1 | 5/2018 | Hindelang et al. |
| 2018/0244029 A1 | 8/2018 | Kim et al. |
| 2018/0313001 A1 | 11/2018 | Dempsey |
| 2018/0326700 A1 | 11/2018 | Kim |
| 2019/0062167 A1 | 2/2019 | Kim et al. |
| 2020/0048100 A1 | 2/2020 | Yu et al. |
| 2020/0108583 A1 | 4/2020 | Oikawa et al. |
| 2020/0215791 A1 | 7/2020 | Oh et al. |
| 2020/0378058 A1 | 12/2020 | Oikawa et al. |
| 2021/0016239 A1 | 1/2021 | Kim et al. |
| 2021/0155486 A1 | 5/2021 | Kang et al. |
| 2021/0163303 A1* | 6/2021 | Evans ............ B32B 5/024 |
| 2021/0309527 A1 | 10/2021 | Evans et al. |
| 2021/0363699 A1 | 11/2021 | Afshari et al. |
| 2021/0370636 A1 | 12/2021 | Tsuruta et al. |
| 2022/0098046 A1 | 3/2022 | Lee et al. |
| 2022/0195137 A1 | 6/2022 | Movahhed et al. |
| 2022/0204350 A1 | 6/2022 | Oh et al. |
| 2023/0024770 A1 | 1/2023 | Kim et al. |
| 2023/0050685 A1 | 2/2023 | Kim et al. |
| 2023/0212079 A1* | 7/2023 | Somberg ......... C04B 14/4656 428/325 |
| 2023/0331560 A1 | 10/2023 | Kim et al. |
| 2023/0348285 A1 | 11/2023 | Numrich et al. |
| 2024/0042731 A1 | 2/2024 | Servati et al. |

FOREIGN PATENT DOCUMENTS

| | | |
|---|---|---|
| CN | 106565268 B | 1/2020 |
| CN | 113939942 A | 1/2022 |
| CN | 115748088 A | 3/2023 |
| CN | 116154360 A | 5/2023 |
| CN | 116945715 A | 10/2023 |
| EP | 4056539 A1 | 9/2022 |
| JP | WO2017221687 A1 | 1/2019 |
| JP | WO2018163354 A1 | 12/2019 |
| JP | 2020060291 A | 4/2020 |
| JP | 2021036038 A | 3/2021 |
| JP | 2022529347 A | 6/2022 |
| JP | 7285085 B2 | 6/2023 |
| JP | 7352769 B2 | 9/2023 |
| JP | 7368327 B2 | 10/2023 |
| KR | 100909732 B1 | 7/2009 |
| KR | 101281689 B1 | 7/2013 |
| KR | 20130138275 A | 12/2013 |
| KR | 20150090320 A | 8/2015 |
| KR | 101654795 B1 | 9/2016 |
| KR | 20160125956 A | 11/2016 |
| KR | 20170060027 A | 5/2017 |
| KR | 101748532 B1 | 6/2017 |
| KR | 101752091 B1 | 6/2017 |
| KR | 20170098141 A | 8/2017 |
| KR | 20170132829 A | 12/2017 |
| KR | 20180033064 A | 4/2018 |
| KR | 101911188 B1 | 10/2018 |
| KR | 101928538 B1 | 12/2018 |
| KR | 101966406 B1 | 4/2019 |
| KR | 101993643 B1 | 6/2019 |
| KR | 20200073730 A | 6/2020 |
| KR | 20200095323 A | 8/2020 |
| KR | 102192354 B1 | 12/2020 |
| KR | 20210038375 A | 4/2021 |
| KR | 20210071508 A | 6/2021 |
| KR | 20210146798 A | 12/2021 |
| KR | 20220049841 A | 4/2022 |
| KR | 20220137360 A | 10/2022 |
| KR | 20220154727 A | 11/2022 |
| KR | 20220164499 A | 12/2022 |
| KR | 20230005300 A | 1/2023 |
| WO | 2017155311 A1 | 9/2017 |
| WO | 2022126279 A1 | 6/2022 |

OTHER PUBLICATIONS

Emmerling, A. Et A., "Small angle scattering and the structure of aerogels" Journal of Non-Crystalline Solids, Elsevier Science Publishers B.V., 1992, pp. 113-120, vol. 145.

Jeong, S. et al., "Application of Silica Aerogel as an Interlayer Insulating Film", Feature Article, Department of Ceramic Engineering, Yonsei University, Dec. 2001, pp. 84-90, vol. 4, Issue 6.

Zhao, J.J. et al., "A 3-D numerical heat transfer model for silica aerogels based on the porous secondary nanoparticle aggregate structure" Elsevier B.V., Journal of Non-Crystalline Solids, Mar. 2012, pp. 1287-1297, vol. 358.

Dai, Y.J. et al.,"A Theoretical Model for the Effective Thermal Conductivity of Silica Aerogel Composites" Applied Thermal Engineering, Accepted Manuscript, Sep. 2017, pp. 1-29.

International Search Report for Application No. PCT/KR2024/013053 mailed Dec. 19, 2024, 3 pages. [See p. 2, categorizing the cited references].

International Search Report for Application No. PCT/KR2024/015088 mailed Jan. 16, 2025. 3 pages (see p. 2-3, categorizing the cited references).

* cited by examiner

AEROGEL COMPOSITE

CROSS-REFERENCE TO RELATED APPLICATION

This application claims priority to Korean Patent Application No. 10-2024-0058657 filed on May 2, 2024, the content of which is incorporated by reference in its entirety.

BACKGROUND

The present disclosure relates to an aerogel composite and the application use thereof as a heat insulation material.

Aerogel is a super-porous, high specific surface area ($\geq 500$ m$^2$/g) material having a porosity of 90.0% to 99.9% and a pore size in the range of 1 nm to 100 nm, and is a material having excellent properties of ultra-light weight/super-heat insulation/ultra-low dielectric, and the like. Accordingly, research on the development of aerogel materials as well as research on the application use thereof as transparent heat insulation materials and environmentally friendly high-temperature heat insulation materials, ultra-low dielectric thin films for highly integrated devices, catalysts and catalyst carriers, electrodes for supercapacitors, and electrode materials for seawater desalination have been actively conducted.

The biggest advantage of an aerogel is that it has super-insulation properties exhibiting thermal conductivity of 0.300 W/m·K or less, which is lower than that of an organic heat insulation material such as conventional Styrofoam.

In general, the aerogel is prepared by preparing a hydrogel from a silica precursor such as water glass and an alkoxysilane group (TEOS, TMOS, MTMS, and the like) and removing a liquid component inside the hydrogel without destroying the microstructure.

Particularly, a hydrophobic silica aerogel blanket in which a hydrophobic silica aerogel is formed in a fiber is a functional heat insulation material which prevents corrosion by moisture, and is widely used in construction or industrial fields, and in addition, the hydrophobic silica aerogel blanket may be usefully used as a heat insulation material or a heat insulation material for aircraft, ships, automobiles, batteries, and the like.

However, when the aerogel blanket is installed and applied to the above-mentioned applications, especially high-temperature piping, the aerogel blanket is often exposed to a high-temperature environment for a long period of time, in which case, some components present in the aerogel may be either decomposed or lost, thereby causing a problem in which the aerogel structure is collapsed or the like. The above-described problem may also occur when the aerogel blanket is applied to a battery module inside a vehicle, and therefore, in terms of safety, the aerogel blanket is required to have excellent thermal stability with a low degree of decomposition or loss of aerogel components even when exposed to a high-temperature environment for a long period of time.

SUMMARY

The present disclosure provides an aerogel composite with excellent thermal stability even when exposed to a high-temperature environment for a long period of time.

However, the technical task to be achieved by the present disclosure is not limited to the aforementioned task, and other tasks that are not mentioned will be clearly understood by those skilled in the art from the following description.

In accordance with an aspect of the present disclosure, an aerogel composite includes a fiber substrate including a plurality of discrete fibers and voids between the fibers, and silica aerogel including a plurality of aerogel particles positioned on the fiber or in the voids between the fibers, and having a network structure including one or more pores, wherein the weight retention rate measured after heating the aerogel composite at a temperature of 350° C. for 60 minutes is 96% or greater.

The weight retention rate measured after heating the aerogel composite at 350° C. for 5 minutes or 30 minutes may satisfy Equation 2 below.

$$A\ (\%) = \{(\text{Weight retention rate measured after heating for } x \text{ minutes } (a)) - (\text{Average value of weight retention rates after heating } (b))\} / (\text{Average value of weight retention rates after heating } (b)) \times 100 \qquad \text{[Equation 2]}$$

In Equation 2 above, the x minutes may be 5 minutes or 30 minutes, the weight retention rate measured after heating for the x minutes (a) may be a percentage (%) of the weight of the aerogel composite measured after heating the aerogel composite at a temperature of 350° C. for the x minutes with respect to the weight of the aerogel composite at 350° C. before the heating, and an average value (b) of weight retention rates after the heating may mean an average value of weight retention rates obtained after heating the aerogel composite at a temperature of 350° C. for each of 5 minutes, 10 minutes, 15 minutes, 20 minutes, 25 minutes, and 30 minutes.

The A may be a real number of $-1.0$ to $+1.0$, or a real number of $-0.80$ to $+0.80$.

A weight retention rate (a) of the aerogel composite measured after heating the aerogel composite at 350° C. for each of 5 minutes and 30 minutes may satisfy Equation 2 above.

The weight retention rate (a) of the aerogel composite measured after heating the aerogel composite at 350° C. for each of 5 minutes, 10 minutes, 15 minutes, 20 minutes, 25 minutes, and 30 minutes may satisfy Equation 2 above.

The weight retention rate measured after heating the aerogel composite at a temperature of 350° C. for 30 minutes may be 97% or greater.

When the aerogel composite is heated at a temperature of 350° C. for each of 5 minutes and 60 minutes, an absolute value (B) of change in weight retention rate of the aerogel composite per unit time may satisfy Equation 3 below.

$$B = |\{(\text{Weight retention rate measured after heating for } y \text{ minutes}) - (\text{Weight retention rate measured after heating for } z \text{ minutes})\} / (y-z)| \qquad \text{[Equation 3]}$$

In Equation 3 above, the y may be 5 minutes, and the z may be 60 minutes, the weight retention rate measured after heating for the y minutes may be a percentage (%) of the weight of the aerogel composite measured after heating the aerogel composite at a temperature of 350° C. for the y minutes with respect to the weight of the aerogel composite before the heating, and the weight retention rate measured after heating for the z minutes may be a percentage (%) of the weight of the aerogel composite measured after heating the aerogel composite at a temperature of 350° C. for the z minutes with respect to the weight of the aerogel composite before the heating. In addition, the B may be a real number of $1.0 \times 10^{-3}$ to $7.0 \times 10^{-2}$.

The total volume ratio of the fibers per unit volume of the aerogel composite may be 2% to 12%, and the volume ratio of the aerogel including pores and the voids between discrete fibers per unit volume of the aerogel composite may be 88% to 98%.

The total volume ratio of the fibers per unit volume of the aerogel composite may be 5% to 10%, and the volume ratio of the aerogel including pores and the voids between discrete fibers per unit volume of the aerogel composite may be 90% to 95%.

The fiber substrate in the aerogel composite and aerogel may be included in a weight ratio of 1:0.4 to 2.

The aerogel may be the silica aerogel.

The aerogel may comprise at least one selected from the group consisting of silica, methylsilylated silica, dimethylsilylated silica, and trimethylsilylated silica.

The aerogel composite may have a moisture impregnation rate (wt %) of 4 wt % or less with respect to a specimen having a size of 100 mm×100 mm and represented by Equation 4 below.

Moisture impregnation rate (wt %)={(Weight of specimen after impregnation−Weight of specimen before impregnation)/(Weight of specimen before impregnation)}×100    [Equation 4]

In Equation 4 above, the weight of a specimen after impregnation may mean the weight measured after impregnating an aerogel composite specimen in distilled water at 21±2° C. for 15 minutes.

The aerogel composite may have a moisture impregnation rate (wt %) of 2 wt % or less with respect to a specimen having a size of 10 mm×10 mm and represented by Equation 4 above.

In accordance with another aspect of the present disclosure, a heat insulation member includes the aerogel composite provided in the present disclosure.

The heat insulation member may further include a support member positioned on at least one surface.

BRIEF DESCRIPTION OF THE DRAWINGS

Exemplary embodiments can be understood in more detail from the following description taken in conjunction with the accompanying drawings, in which.

DETAILED DESCRIPTION

Figure 1:
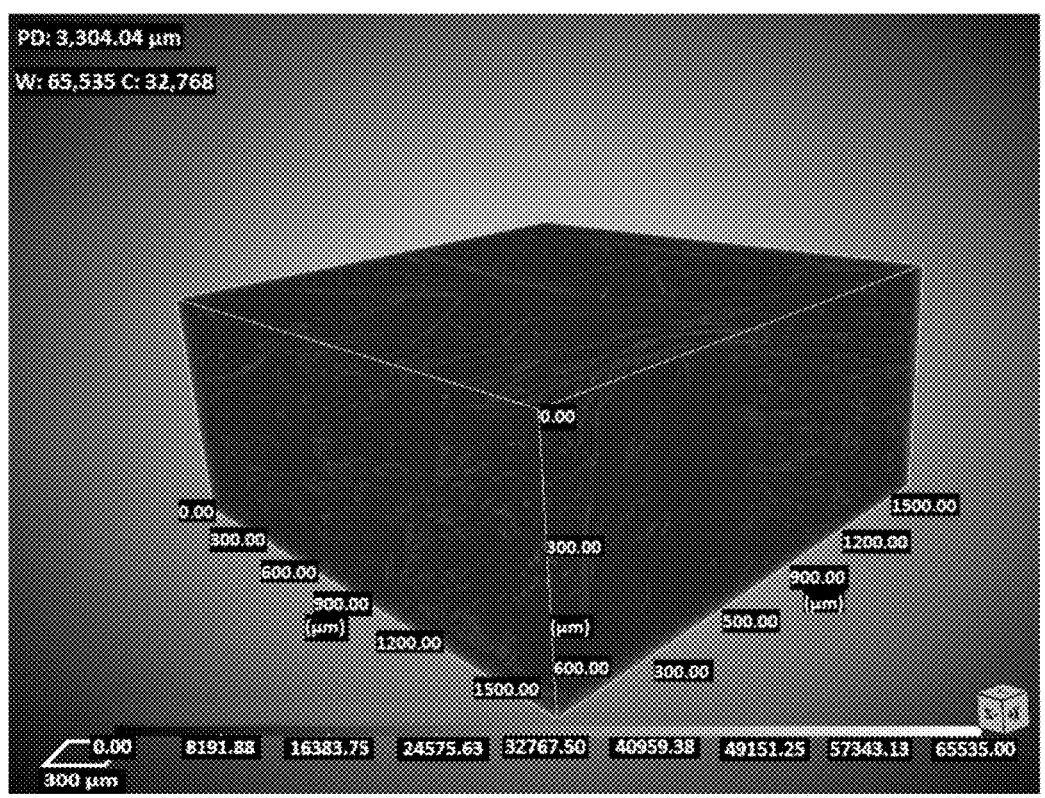
FIG. 1 illustrates an example process of performing in-situ XRM analysis on an aerogel composite in Experimental Example 1, and then setting and extracting a segmentation region for analyzing a volume occupancy ratio of fibers in the aerogel composite and the remaining portion thereof other than the fibers using Dragonfly software.

Hereinafter, the present disclosure will be described in more detail to facilitate understanding of the present disclosure. In this case, it will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

According to an aspect of the present disclosure, the present disclosure relates to an aerogel composite which includes a fiber substrate, and aerogel including one or more pores.

In the present disclosure, an "aerogel" includes a plurality of primary aerogel particles having a size of greater than approximately 0 nm and less than or equal to 10 nm, greater than 0 nm and less than or equal to 5 nm, and a secondary aerogel particle formed by aggregation or combination of the above-described primary aerogel particles, and since a plurality of open pores are formed between the above-described primary aerogel particles and between the secondary aerogel particles to form an aggregate, the aerogel forms a three-dimensional network structure.

In the present disclosure, the aerogel may be inorganic silica aerogel formed from a silicon alkoxide-based compound or water glass as a precursor. In some aspects, the aerogel may comprise at least one selected from the group consisting of silica, methylsilylated silica, dimethylsilylated silica, trimethylsilylated silica. In some aspects, the aerogel may be that at least a portion of $SiO_2$ present on the surface and/or inside pores of a $SiO_2$ network structure has a bonding structure of Si—O—$SiO_2(CH_3)$, Si—O—SiO$(CH_3)_2$, or Si—O—$Si(CH_3)_3$. A specific process for preparing silica aerogel will be described in detail below.

In the present disclosure, aerogel particles may be positioned on the fiber substrate, or in voids between neighboring fiber substrates, preferably both on the fiber substrate and in the voids between neighboring fiber substrates. In the present disclosure, the "aerogel particles" are particles in the form of individual solid units constituting aerogel, and may include both primary aerogel particles having a size of greater than approximately 0 nm and less than or equal to 10 nm, or greater than approximately 0 nm and less than or equal to 5 nm, preferably having a size of approximately 1 nm, and secondary aerogel particles formed by aggregation of the above-described particles. However, aerogel in an aerogel composite is mostly in the form of secondary aerogel particles or in the form in which the secondary aerogel particles are aggregated and combined, and there may be trace mixtures of primary aerogel particles that do not form secondary aerogel particles. The secondary aerogel particles may have an average particle diameter of approximately 5 nm to 2,000 nm, 5 nm to 1,000 nm, 5 nm to 500 nm, 5 nm to 100 nm, or 5 nm to 50 nm, but are not limited thereto. In the present disclosure, the above-described average particle size may be measured by any method known to those skilled in the art, such as scanning electron microscopy, dynamic light scattering, optical microscopy, or size exclusion, but the method is not limited thereto.

In the present disclosure, the aerogel may have a skeletal structure including mesopores, and may include micropores or macropores in addition to the mesopores. Here, the "mesopore" is a pore having an average pore diameter in the range of approximately 2 nm to approximately 50 nm, the "macropore" is a pore having an average pore diameter in the range of greater than approximately 50 nm, and the "micropore" is a pore having an average pore diameter in the range of less than approximately 2 nm. In the present disclosure, the aerogel may include mesopores of at least 50%, at least 60%, at least 70%, at least 80%, at least 90%, at least 95%, at least 96%, at least 97%, at least 98%, at least 99%, or 100% of the pore volume of the skeletal structure. In some aspects, the aerogel of the present disclosure may include mesopores. In some aspects, the aerogel of the present disclosure may include mesopores and micropores. In the present disclosure, the pore size may be measured by any means known to those skilled in the art, such as a gas adsorption experiment, mercury infiltration, capillary flow porometry, positron annihilation lifetime spectroscopy (PALS), or the like, but is not limited thereto.

In the present disclosure, the porosity of the aerogel may be 80% or greater, 85% or greater, 88% or greater, 89% or greater, 90% or greater, 91% or greater, 92% or greater, 93% or greater, 94% or greater, 95% or greater, 96% or greater, 97% or greater, 98% or greater, or 99% or greater, preferably 80% or greater, or 99.9% or less, but is not limited thereto.

The aerogel composite of the present disclosure has a structure in which at least some of a plurality of aerogel particles are dispersed, preferably combined, on the surface of a substrate including fibers, and at the same time, has a structure in which at least some of the plurality of aerogel particles are dispersed, preferably positioned, in an empty space between discrete fibers in the substrate. In the present disclosure, examples of the above substrate may be discrete fibers, a film, a sheet, a net, a fiber, a porous body, a foam, a non-woven body, or a laminate of two or more layers thereof. In addition, depending on the application thereof, the substrate may have surface roughness formed or patterned on the surface thereof.

In the present disclosure, the fiber substrate may be polyester, polyolefin terephthalate, poly(ethylene) naphthalate, polycarbonate (e.g., rayon, nylon), cotton (e.g., Lycra® manufactured by DuPont), carbon (e.g., graphite), polyacrylonitrile (PAN), oxidized PAN, non-carbonized heat-treated PAN (such as those made of SGL carbon), a glass fiber-based material (S-glass, 901 glass, 902 glass, 475 glass, E-glass, etc.), a silica-based fiber such as Quartz (e.g., Quartzel® manufactured by Saint-Gobain), Q-Fiber® felt (manufactured by Jones Manville), Saffil (manufactured by Saffil), Durablanket (manufactured by Unifrax) and other silica fibers, Duraback® (manufactured by Carborundum), a polyaramid fiber such as Kevlar®, Nomex®, and Sontera® (all manufactured by DuPont), CONEX (manufactured by Taijin), a polyolefin such as Tyvek® (manufactured by DuPont), Dyneema (manufactured by DSM), Spectra® (manufactured by Honeywell), other polypropylene fibers such as Typar® and Xavan® (both manufactured by DuPont), a fluoropolymer such as PTFE under the trade name Teflon® (manufactured by DuPont), Goretex® (manufactured by W.L. GORE), a silicon carbide fiber such as NICALCON (manufactured by COI Ceramics), a ceramic fiber such as NEXTEL (manufactured by 3M), a ceramic paper, an acrylic polymer, wool, silk, hemp, leather, a suede fiber, a PBO fiber Zylong® (manufactured by Toyobo), a liquid crystal material such as VECTAN (manufactured by Hoechst), a cambrel fiber (manufactured by DuPont), polyurethane, polyamide, a wool fiber, a basalt fiber, boron, aluminum, iron, a stainless steel fiber and other thermoplastic resins such as PEEK, PES, PET, PEK, PPS, and the like, but any fiber may be used without limitation as long as it is a fiber which includes spaces or voids into which an aerogel may be easily inserted, thereby improving heat insulation performance. In some aspects, in the present disclosure, the fiber substrate may include a glass fiber. In some aspects, in the present disclosure, the fiber substrate may be made of a glass fiber, but is not limited thereto.

In the present disclosure, the thickness of the fiber substrate may be approximately 0.5 nm to 20 mm, but is not limited thereto.

The aerogel composite provided in the present disclosure may have a rectangular parallelepiped shape in which a fiber substrate and aerogel may be mixed from an upper surface to a lower surface, but is not limited thereto.

In addition, at least a portion of the upper surface or lower surface, preferably the entire surface of the aerogel composite provided in the present disclosure may have a flat shape. Here, the "flat shape" means that irregularities are not formed by an intentional embossing or coating process. In the present disclosure, by forming the upper and lower surfaces of the aerogel composite to be flat as described above, it is possible to increase the ease of work in stacking a support member such as a sheet on the surface of the upper and lower surfaces in the future, and increase the adhesion retention rate of the support member. In addition, even if the aerogel composite itself is directly applied as a heat insulation member without a support member, it is preferable in terms of reducing frictional force with the surface of a device positioned adjacent thereto.

In the present disclosure, the thickness of the aerogel composite may be 0.05 mm to 20 mm, for example, 0.1 mm to 15 mm, 0.1 mm to 10 mm, or 0.1 mm to 5 mm, but is not limited thereto.

In the present disclosure, the density of the aerogel composite may be 0.05 g/cm$^3$ to 0.50 g/cm$^3$, 0.05 g/cm$^3$ to 0.35 g/cm$^3$, 0.05 g/cm$^3$ to 0.30 g/cm$^3$, 0.10 g/cm$^3$ to 0.30 g/cm$^3$, or 0.15 g/cm$^3$ to 0.30 g/cm$^3$, but is not limited thereto.

The aerogel composite provided in the present disclosure includes aerogel including the remaining portion other than the fibers, especially pores, and voids in a specific volume ratio or greater, so that the aerogel may form a solid pore structure, and may secure excellent heat insulation properties due to the pores and the voids, and also, when exposed to high temperatures of 350° C. or higher for a long time, there is little structural change in the aerogel, the voids, or the like, and the degree of hydrophobicity inside the voids and the pores is high, ensuring that the heat insulation properties are maintained at an excellent level without being degraded even in a high-temperature environment.

Specifically, the volume ratio of the remaining portion other than the fibers per unit volume of the aerogel composite of the present disclosure, i.e., the voids between discrete fibers and the aerogel including pores, may be 85% or greater, 86% or greater, 87% or greater, 88% or greater, 89% or greater, or 90% or greater, and 98% or less, 97% or less, 96% or less, 95% or less, 94% or less, or 93% or less, and preferably, may be 88% to 98%, or 90% to 95%.

The volume ratio of the fibers per unit volume of the aerogel composite of the present disclosure may be 2% or greater, 3% or greater, 4% or greater, 5% or greater, 6% or greater, 7% or greater, 8% or greater, 9% or greater, or 10% or greater, and 15% or less, 14% or less, 13% or less, 12% or less, 11% or less, or 10% or less, and preferably, may be 2% to 12%, or 5% to 10%.

However, here, the unit volume of the aerogel composite refers to the volume of an aerogel composite in a rectangular parallelepiped shape with a width×length of 1 cm×1 cm. The unit volume of the aerogel composite is defined as the product of the width, length, and height (thickness) of the aerogel composite, assuming that any pores within the aerogel or voids between the discrete fibers, where aerogel particles do not fill, are occupied by an arbitrary material. The volume of fibers per unit volume of the aerogel composite refers to the total volume occupied by the individual fibers within the unit volume of the aerogel composite. The volume of the remaining portion excluding the fibers, per unit volume of the aerogel composite, includes the volumes of the aerogel containing pores and the voids between the discrete fibers, where the aerogel particles are not occupied. The volume of the pores and voids can be calculated by assuming that these pores and voids are evenly filled with an arbitrary material. The volume of the aerogel containing pores and the voids between the fibers per unit volume of the aerogel composite can be calculated by subtracting the volume of the fibers from the unit volume of the aerogel composite.

In the present disclosure, the above-described volume ratio of the voids and the aerogel including pores per unit volume of the aerogel composite may be obtained by randomly obtaining, from the aerogel composite, a total of five rectangular parallelepiped specimens with a width× length of 1 cm×1 cm and a thickness, which is the thickness of the aerogel composite, and then calculating an average value of volume ratios of the voids and the aerogel including pores per unit volume of the aerogel composite as measured from each specimen. At this time, the five specimens may be obtained by obtaining four specimens by positioning a position, which is spaced apart by 10 cm in a center direction from each corner of the aerogel composite prepared in a rectangular shape (e.g., which may have a size of 60 cm×12 cm, but is not limited thereto) prepared in a rectangular parallelepiped shape, at the exact center of each specimen, and obtaining one specimen by positioning the exact central portion of the aerogel composite at the exact center of a specimen.

In addition, in the present disclosure, the volume ratio of the voids and the aerogel including pores per unit volume of the aerogel composite described above may be measured by placing an aerogel composite specimen in a load cell of DEBEN Co. and then performing in situ XRM analysis by using VERSA 520 equipment of ZEISS Co., and by measuring the volume ratio of the fibers and the remaining portion other than the fibers in a segmentation to be analyzed using Dragonfly software (version 2021.3). At this time, the size (width×length×height) of the segmentation to be analyzed is not specifically limited, and the segmentation may be set and extracted to each size or less of the unit volume. In some aspects, the segmentation may be set and extracted to a width×length×height of approximately 1700 µm×1600 µm×500 µm. However, in the present specification, the above-described method is merely described as an example of a method for measuring the volume ratio of the aerogel including pores and the voids between fibers per unit volume of the aerogel composite described above, and the method is not limited to the above-described method.

In addition, after heating the aerogel composite of the present disclosure at a temperature of 200° C. for 1 hour, the volume ratio of the remaining portion other than the fibers per unit volume of the heat-treated aerogel composite, i.e., the aerogel including pores and the voids between discrete fibers, may be 83% or greater, 84% or greater, 85% or greater, 86% or greater, 87% or greater, 88% or greater, 88% or greater, 89% or greater, 90% or greater, and 98% or less, 97% or less, 96% or less, 95% or less, 94% or less, or 93% or less, 92% or less, 91% or less, or 90% or less, and preferably, may be 85% to 98%, 88% to 98%, or 90% to 95%.

In addition, after heating the aerogel composite of the present disclosure at a temperature of 200° C. for 1 hour, the volume ratio of the fibers per unit volume of the heat-treated aerogel composite may be 2% or greater, 3% or greater, 4% or greater, 5% or greater, 6% or greater, 7% or greater, 8% or greater, 9% or greater, 10% or greater, 11% or greater, 12% or greater, and 17% or less, 16% or less, 15% or less, 14% or less, 13% or less, 12% or less, 11% or less, or 10% or less, and preferably, may be 2% to 15%, 2% to 12%, or 5% to 10%.

After heating the aerogel composite provided in the present disclosure at a temperature of 200° C. for 1 hour, the volume ratio of the aerogel including pores and the voids between discrete fibers based on the unit volume of the aerogel composite may be 0.8 times to 1.5 times, 0.8 times to 1.3 times, 0.8 times to 1.2 times, 0.9 times to 1.2 times, or 0.9 times to 1.1 times the volume ratio of the aerogel including pores and the voids between discrete fibers based on the unit volume of the aerogel composite before heating.

In addition, the aerogel composite provided in the present disclosure includes aerogel in an amount greater than or equal to a specific ratio with respect to the fiber substrate, and thus, may exhibit an excellent heat insulation effect at both room temperature and high temperatures.

Specifically, the aerogel composite of the present disclosure may include the aerogel by 0.35 times or more, 0.4 times or more, or 0.45 times or more based on the weight of the fiber substrate, and for example, may include the fiber substrate and the aerogel at a weight ratio of 1:0.35 to 2, preferably 1:0.4 to 2, 1:0.4 to 1, or 1:0.45 to 1.

Even when exposed to a temperature of 350° C. or higher for a long period of time of 1 hour or more, the aerogel composite provided in the present disclosure has a high weight retention rate of the aerogel composite, and maintains the weight retention rate constant within a specific range, so that the heat insulation performance may also be maintained at an excellent level without significant degradation.

In the present specification, as shown in Equation 1 below, the "weight retention rate" is a ratio of the weight of the aerogel composite measured after heating the aerogel composite at 350° C., with respect to the weight of the aerogel composite before the heating represented as a percentage. Here, the predetermined time may be, for example, 1 minute or more, 5 minutes or more, 10 minutes or more, 20 minutes or more, 25 minutes or more, 30 minutes or more, 40 minutes or more, 50 minutes or more, 60 minutes or more, 70 minutes or more, 80 minutes or more, 90 minutes or more, 2 hours or more, 4 hours or more, or 6 hours or more, and 12 hours or less, 6 hours or less, 4 hours or less, 2 hours or less, 90 minutes or less, 80 minutes or less, 70 minutes or less, 60 minutes or less, 40 minutes or less, 30 minutes or less, 20 minutes or less, 10 minutes or less, or 5 minutes or less, and one example thereof may be 5 minutes to 30 minutes, and another example thereof may be 5 minutes, 10 minutes, 15 minutes, 20 minutes, 25 minutes, or 30 minutes, but the present disclosure is not limited thereto.

Weight retention rate of aerogel composite after heating (wt %)={(Weight of aerogel composite after heating)/(Weight of aerogel composite before heating)}×100    [Equation 1]

The weight retention rate measured after heating the aerogel composite of the present disclosure at a temperature of 350° C. for any selected continuous time among 5 minutes to 30 minutes may satisfy Equation 2 below.

$A$ (%)={(Weight retention rate measured after heating for $x$ minutes ($a$))−(Average value of weight retention rates after heating ($b$))}/(Average value of weight retention rates after heating ($b$))×100    [Equation 2]

In Equation 2 above, the "x minutes" means any selected duration from a continuous range from 5 minutes to 30 minutes. For example, the "x minutes" may be 5 minutes, 10 minutes, 15 minutes, 20 minutes, 25 minutes, or 30 minutes, but is not limited thereto.

In addition, the "weight retention rate measured after heating for the x minutes (a)" is a percentage (%) of the weight of the aerogel composite measured after heating the aerogel composite at a temperature of 350° C. for the x minutes with respect to the weight of the aerogel composite before heating the same at 350° C. according to Equation 1.

In addition, the "average value of weight retention rates after heating (b)" means an average value of weight retention rates of the aerogel composite obtained after heating the aerogel composite at a temperature of 350° C. for at least two selected durations from 5 minutes to 30 minutes. In some aspects, the "average value of weight retention rates after heating (b)" may mean an average value of weight retention rates of the aerogel composite obtained after heating the aerogel composite at 350° C. for at least two selected durations among 5 minutes, 10 minutes, 15 minutes, 20 minutes, 25 minutes, and 30 minutes with respect to the weight of the aerogel composite before heating.

The A (%) may be a real number which falls within the range of −1.0 to +1.0, −0.95 to +0.95, −0.90 to +0.90, −0.85 to +0.85, −0.80 to +0.80, −0.75 to +0.75, −0.70 to +0.70, −0.65 to +0.65, −0.60 to +0.60, −0.55 to +0.55, −0.50 to +0.50, −0.45 to +0.45, −0.40 to +0.40, −0.35 to +0.35, −0.30 to +0.30, −0.25 to +0.25, −0.20 to +0.20, −0.15 to +0.15, or −0.10 to +0.10.

In some aspects, the weight retention rate of the aerogel composite measured after heating the aerogel composite at 350° C. for 5 minutes, 10 minutes, 15 minutes, 20 minutes, 25 minutes, or 30 minutes may satisfy Equation 2 above. At this time, the average value of weight retention rates after heating (b) may mean an average value of weight retention rates of the aerogel composite obtained after heating the aerogel composite at 350° C. for at least two durations selected among 5 minutes, 10 minutes, 15 minutes, 20 minutes, 25 minutes, and 30 minutes.

In some aspects, the weight retention rate of the aerogel composite measured after heating the aerogel composite at 350° C. for 5 minutes or 30 minutes may satisfy Equation 2 above. At this time, the average value of weight retention rates after heating (b) may mean an average value of weight retention rates of the aerogel composite obtained after heating the aerogel composite at 350° C. for at least two selected durations among 5 minutes, 10 minutes, 15 minutes, 20 minutes, 25 minutes, and 30 minutes.

In some aspects, the weight retention rate of the aerogel composite measured after heating the aerogel composite at 350° C. for each of 5 minutes and 30 minutes may satisfy Equation 2 above. At this time, the average value of weight retention rates after heating (b) may mean an average value of weight retention rates of the aerogel composite obtained after heating the aerogel composite at 350° C. for at least two selected durations among 5 minutes, 10 minutes, 15 minutes, 20 minutes, 25 minutes, and 30 minutes.

In some aspects, the weight retention rate of the aerogel composite measured after heating the aerogel composite at 350° C. for 5 minutes may satisfy Equation 2 above. At this time, the average value of weight retention rates after heating (b) may mean an average value of weight retention rates of the aerogel composite obtained after heating the aerogel composite at 350° C. for each of 5 minutes, 10 minutes, 15 minutes, 20 minutes, 25 minutes, and 30 minutes. At this time, the A (%) may be a real number which falls within the range of −1.0 to +1.0, −0.95 to +0.95, −0.90 to +0.90, −0.85 to +0.85, −0.80 to +0.80, −0.75 to +0.75, −0.70 to +0.70, −0.65 to +0.65, 0 to +1.0, 0 to +0.95, 0 to +0.90, 0 to +0.85, 0 to +0.80, 0 to +0.75, 0 to +0.70, or 0 to +0.65.

In some aspects, the weight retention rate of the aerogel composite measured after heating the aerogel composite at 350° C. for 10 minutes may satisfy Equation 2 above. At this time, the average value of weight retention rates after heating (b) may mean an average value of weight retention rates of the aerogel composite obtained after heating the aerogel composite at 350° C. for each of 5 minutes, 10 minutes, 15 minutes, 20 minutes, 25 minutes, and 30 minutes. At this time, the A (%) may be a real number which falls within the range of −0.80 to +0.80, −0.75 to +0.75, −0.70 to +0.70, −0.65 to +0.65, −0.60 to +0.60, −0.55 to +0.55, −0.50 to +0.50, −0.45 to +0.45, 0 to +0.80, 0 to +0.75, 0 to +0.70, 0 to +0.65, 0 to +0.60, 0 to +0.55, 0 to +0.50, or 0 to +0.45.

In some aspects, the weight retention rate of the aerogel composite measured after heating the aerogel composite at 350° C. for 15 minutes may satisfy Equation 2 above. At this time, the average value of weight retention rates after heating (b) may mean an average value of weight retention rates of the aerogel composite obtained after heating the aerogel composite at 350° C. for each of 5 minutes, 10 minutes, 15 minutes, 20 minutes, 25 minutes, and 30 minutes. At this time, the A (%) may be a real number which falls within the range of −0.60 to +0.60, −0.55 to +0.55, −0.50 to +0.50, −0.45 to +0.45, −0.40 to +0.40, −0.35 to +0.35, −0.30 to +0.30, −0.25 to +0.25, or −0.20 to +0.20.

In some aspects, the weight retention rate of the aerogel composite measured after heating the aerogel composite at 350° C. for 20 minutes may satisfy Equation 2 above. At this time, the average value of weight retention rates after heating (b) may mean an average value of weight retention rates of the aerogel composite obtained after heating the aerogel composite at 350° C. for each of 5 minutes, 10 minutes, 15 minutes, 20 minutes, 25 minutes, and 30 minutes. At this time, the A (%) may be a real number which falls within the range of −0.50 to +0.50, −0.45 to +0.45, −0.40 to +0.40, −0.35 to +0.35, −0.30 to +0.30, −0.25 to +0.25, −0.20 to +0.20, −0.15 to +0.15, −0.10 to +0.10, −0.50 to 0, −0.45 to 0, −0.40 to 0, −0.35 to 0, −0.30 to 0, −0.25 to 0, −0.20 to 0, −0.15 to 0, or −0.10 to 0.

In some aspects, the weight retention rate of the aerogel composite measured after heating the aerogel composite at 350° C. for 25 minutes may satisfy Equation 2 above. At this time, the average value of weight retention rates after heating (b) may mean an average value of weight retention rates of the aerogel composite obtained after heating the aerogel composite at 350° C. for each of 5 minutes, 10 minutes, 15 minutes, 20 minutes, 25 minutes, and 30 minutes. At this time, the A (%) may be a real number which falls within the range of −0.80 to +0.80, −0.75 to +0.75, −0.70 to +0.70, −0.65 to +0.65, −0.60 to +0.60, −0.55 to +0.55, −0.50 to +0.50, −0.80 to 0, −0.75 to 0, −0.70 to 0, −0.65 to 0, −0.60 to 0, −0.55 to 0, or −0.50 to 0.

In some aspects, the weight retention rate of the aerogel composite measured after heating the aerogel composite at 350° C. for 30 minutes may satisfy Equation 2 above. At this time, the average value of weight retention rates after heating (b) may mean an average value of weight retention rates of the aerogel composite obtained after heating the aerogel composite at 350° C. for each of 5 minutes, 10 minutes, 15 minutes, 20 minutes, 25 minutes, and 30 minutes. At this time, the A (%) may be a real number which falls within the range of −1.0 to +1.0, −0.95 to +0.95, −0.90 to +0.90, −0.85 to +0.85, −0.80 to +0.80, −0.75 to +0.75, −1.0 to 0, −0.95 to 0, −0.90 to 0, −0.85 to 0, −0.80 to 0, or −0.75 to 0.

In some aspects, the weight retention rate of the aerogel composite measured after heating the aerogel composite at 350° C. for each of 5 minutes or 30 minutes may satisfy Equation 2 above. At this time, the average value of weight retention rates after heating (b) may mean an average value of weight retention rates of the aerogel composite obtained after heating the aerogel composite at 350° C. for each of 5 minutes, 10 minutes, 15 minutes, 20 minutes, 25 minutes, and 30 minutes.

At this time, the A (%) may be a real number which falls within the range of −1.0 to +1.0, −0.95 to +0.95, −0.90 to +0.90, −0.85 to +0.85, −0.80 to +0.80, or −0.75 to +0.75.

In some aspects, the weight retention rate of the aerogel composite measured after heating the aerogel composite at 350° C. for each of 5 minutes and 30 minutes may satisfy Equation 2 above. At this time, the average value of weight retention rates after heating (b) may mean an average value of weight retention rates of the aerogel composite obtained after heating the aerogel composite at 350° C. for each of 5 minutes, 10 minutes, 15 minutes, 20 minutes, 25 minutes, and 30 minutes. At this time, the A (%) may be a real number which falls within the range of −1.0 to +1.0, −0.95 to +0.95, −0.90 to +0.90, −0.85 to +0.85, −0.80 to +0.80, or −0.75 to +0.75.

In some aspects, the average value of weight retention rates after heating (b) may mean an average value of weight retention rates of the aerogel composite obtained after heating the aerogel composite at 350° C. for each of 5 minutes, 10 minutes, 15 minutes, 20 minutes, 25 minutes, and 30 minutes may satisfy Equation 2 above. At this time, the average value of weight retention rates after heating (b) may mean an average value of weight retention rates of the aerogel composite obtained after heating the aerogel composite at 350° C. for each of 5 minutes, 10 minutes, 15 minutes, 20 minutes, 25 minutes, and 30 minutes. At this time, the A (%) may be a real number which falls within the range of −1.0 to +1.0, −0.95 to +0.95, −0.90 to +0.90, −0.85 to +0.85, −0.80 to +0.80, or −0.75 to +0.75.

In addition, when heating the aerogel composite provided in the present disclosure to a temperature of 350° C., an absolute value (B) of the change in weight retention rate of the aerogel composite per unit time may satisfy Equation 3 below.

$$B = |\{(\text{Weight retention rate measured after heating for } y \text{ minutes}) - (\text{Weight retention rate measured after heating for } z \text{ minutes})\}/(y-z)| \quad \text{[Equation 3]}$$

In Equation 3 above, the y and the z are each independently a duration selected from 5 minutes to 60 minutes, and are different from each other. At this time, the unit time may be 'minute.'

In addition, the "weight retention rate measured after heating for the y minutes" and the "weight retention rate measured after heating for the z minutes" each mean a percentage (%) of the weight of the aerogel composite measured after heating the aerogel composite at a temperature of 350° C. for the y minutes or z minutes with respect to the weight of the aerogel composite before heating according to Equation 3.

In addition, the B may be a real number which falls within the range of $1.0 \times 10^{-3}$ to $7.0 \times 10^{-2}$, $1.5 \times 10^{-3}$ to $7.0 \times 10^{-2}$, $1.0 \times 10^{-3}$ to $6.5 \times 10^{-2}$, $1.5 \times 10^{-3}$ to $6.5 \times 10^{-2}$, $1.0 \times 10^{-3}$ to $6.0 \times 10^{-2}$, $1.5 \times 10^{-3}$ to $6.0 \times 10^{-2}$, $2.0 \times 10^{-3}$ to $6.0 \times 10^{-2}$, $2.5 \times 10^{-3}$ to $6.0 \times 10^{-2}$, $3.0 \times 10^{-3}$ to $6.0 \times 10^{-2}$, $3.5 \times 10^{-3}$ to $6.0 \times 10^{-2}$, $4.0 \times 10^{-3}$ to $6.0 \times 10^{-2}$, $1.0 \times 10^{-3}$ to $5.5 \times 10^{-2}$, $1.5 \times 10^{-3}$ to $5.5 \times 10^{-2}$, $2.0 \times 10^{-3}$ to $5.5 \times 10^{-2}$, $2.5 \times 10^{-3}$ to $5.5 \times 10^{-2}$, $3.0 \times 10^{-3}$ to $5.5 \times 10^{-2}$, $3.5 \times 10^{-3}$ to $5.5 \times 10^{-2}$, or $4.0 \times 10^{-3}$ to $5.5 \times 10^{-2}$.

In some aspects, in Equation 3 above, the y may be 5 minutes, and z may be 30 minutes, or the y may be 30 minutes, and the z may be 5 minutes. At this time, the B may be a real number of $3.0 \times 10^{-3}$ to $7.0 \times 10^{-2}$, $3.5 \times 10^{-3}$ to $7.0 \times 10^{-2}$, $4.0 \times 10^{-3}$ to $7.0 \times 10^{-2}$, $4.0 \times 10^{-3}$ to $6.5 \times 10^{-2}$, $4.5 \times 10^{-3}$ to $6.5 \times 10^{-2}$, $5.0 \times 10^{-3}$ to $6.5 \times 10^{-2}$, $5.0 \times 10^{-3}$ to $6.0 \times 10^{-2}$, $5.5 \times 10^{-3}$ to $6.0 \times 10^{-2}$, or $6.0 \times 10^{-3}$ to $5.5 \times 10^{-2}$.

In some aspects, in Equation 3 above, the y may be 5 minutes, and z may be 40 minutes, or the y may be 40 minutes, and the z may be 5 minutes. At this time, the B may be a real number of $2.0 \times 10^{-3}$ to $7.0 \times 10^{-2}$, $2.5 \times 10^{-3}$ to $7.0 \times 10^{-2}$, $3.0 \times 10^{-3}$ to $7.0 \times 10^{-2}$, $3.0 \times 10^{-3}$ to $6.5 \times 10^{-2}$, $3.5 \times 10^{-3}$ to $6.5 \times 10^{-2}$, $4.0 \times 10^{-3}$ to $6.5 \times 10^{-2}$, $4.0 \times 10^{-3}$ to $6.0 \times 10^{-2}$, $4.5 \times 10^{-3}$ to $6.0 \times 10^{-2}$, $5.0 \times 10^{-3}$ to $6.0 \times 10^{-2}$, $5.0 \times 10^{-3}$ to $5.5 \times 10^{-2}$, or $5.0 \times 10^{-3}$ to $5.0 \times 10^{-2}$.

In some aspects, in Equation 3 above, the y may be 5 minutes, and z may be 50 minutes, or the y may be 50 minutes, and the z may be 5 minutes. At this time, the B may be a real number of $1.5 \times 10^{-3}$ to $6.0 \times 10^{-2}$, $2.0 \times 10^{-3}$ to $6.0 \times 10^{-2}$, $2.5 \times 10^{-3}$ to $6.0 \times 10^{-2}$, $2.5 \times 10^{-3}$ to $5.5 \times 10^{-2}$, $3.0 \times 10^{-3}$ to $5.5 \times 10^{-2}$, $3.5 \times 10^{-3}$ to $5.5 \times 10^{-2}$, $3.5 \times 10^{-3}$ to $5.0 \times 10^{-2}$, $3.5 \times 10^{-3}$ to $4.5 \times 10^{-2}$, $3.5 \times 10^{-3}$ to $4.0 \times 10^{-2}$, $4.0 \times 10^{-3}$ to $3.5 \times 10^{-2}$, or $4.0 \times 10^{-3}$ to $3.0 \times 10^{-2}$.

In some aspects, in Equation 3 above, the y may be 5 minutes, and z may be 60 minutes, or the y may be 60 minutes, and the z may be 5 minutes. At this time, the B may be a real number of $1.0 \times 10^{-3}$ to $6.0 \times 10^{-2}$, $1.5 \times 10^{-3}$ to $6.0 \times 10^{-2}$, $2.0 \times 10^{-3}$ to $6.0 \times 10^{-2}$, $2.0 \times 10^{-3}$ to $5.5 \times 10^{-2}$, $2.5 \times 10^{-3}$ to $5.5 \times 10^{-2}$, $2.5 \times 10^{-3}$ to $5.5 \times 10^{-2}$, $3.0 \times 10^{-3}$ to $5.5 \times 10^{-2}$, $3.0 \times 10^{-3}$ to $5.0 \times 10^{-2}$, $3.0 \times 10^{-3}$ to $4.5 \times 10^{-2}$, or $3.0 \times 10^{-3}$ to $4.0 \times 10^{-2}$.

In the present disclosure, the aerogel composite may have a weight retention rate of 97% or greater, 98% or greater, or 99% greater as measured after heating the aerogel composite at a temperature of 350° C. for 30 minutes.

In the present disclosure, the aerogel composite may have a weight retention rate of 96% or greater, 97% or greater, 98% or greater, or 99% greater as measured after heating the aerogel composite at a temperature of 350° C. for 60 minutes.

The thermal stability of the aerogel composite, that is, the change in weight retention rate, can be measured while maintaining the aerogel composite at a high temperature of 350° C. for a predetermined time after performing pre-heat treatment at 150° C. for 1 hour in order to exclude the influence of moisture on the aerogel composite.

In the aerogel composite of the present disclosure, a moisture impregnation ratio (wt %) represented by Equation 4 below may be 5 wt % or less.

$$\text{Moisture impregnation rate (wt \%)} = \{(\text{Weight of specimen after impregnation} - \text{Weight of specimen before impregnation})/(\text{Weight of specimen before impregnation})\} \times 100 \quad \text{[Equation 4]}$$

In Equation 4 above, the moisture impregnation rate may be calculated by floating a specimen of the aerogel composite on distilled water at 21±2° C., and then placing a 6.4 mm mesh screen on top of the specimen to impregnate the specimen by sinking the same to 127 mm below the surface of the water, and after 15 minutes, removing the mesh screen and when the specimen rises to the surface, picking the specimen up with a clamp and hanging the specimen vertically for 60±5 seconds, and then measuring the weight retention rate by measuring the weight before and after the impregnation, respectively. Here, the lower the moisture impregnation rate, the higher the degree of hydrophobicity of the aerogel composite.

In the present disclosure, surface water repellency and cross-section water repellency for respectively evaluating the degree of hydrophobicity on the surface of the aerogel composite and the degree of hydrophobicity inside the aerogel composite may all be measured using Equation 4 above, and may be measured by varying specimens used at this time. Specifically, in the present disclosure, when measuring the moisture impregnation rate, a moisture impregnation rate measured using a relatively large aerogel composite specimen having a size of 100 mm×100 mm, which is similar to the size of a commercially available aerogel blanket, is intended to represent water repellency on the surface of the aerogel composite. The low surface moisture impregnation rate described above means that the degree of hydrophobicity on the surface of the aerogel composite is high. In the present disclosure, the surface water repellency of the aerogel composite calculated through Equation 4 above may be 5 wt % or less, preferably 4 wt % or less.

In addition, in the present disclosure, when measuring the moisture impregnation rate, a moisture impregnation rate measured using an aerogel composite specimen cut to a size of a relatively small size, for example, a size of 10 mm×10 mm, is intended to represent water repellency on the cross-section of the aerogel composite. The low cross-section moisture impregnation rate described above means that the degree of hydrophobicity is high not only on the surface of the aerogel composite, but also inside the aerogel composite. In the present disclosure, the cross-section water repellency of the aerogel composite calculated through Equation 4 above may be 2 wt % or less, preferably 1.5 wt % or less.

In the present disclosure, the aerogel composite may have a thermal conductivity at room temperature (23±5° C.) of 30.0 mW/mK or less, 25.0 mW/mK or less, or 20.0 mW/mK or less, preferably 15.0 mW/mK or less, and when in this range, there is an effect of securing the heat insulation properties of the aerogel composite to the maximum.

In the present disclosure, the aerogel composite may have a thermal conductivity at a high temperature (150° C.) of 35.0 mW/mK or less, 30.0 mW/mK or less, or 25.0 mW/mK or less, and when in this range, there is an effect of securing the heat insulation properties of the aerogel composite to the maximum.

In the present disclosure, the aerogel composite has a compressive strength of 20 kPa to 80 kPa, 20 kPa to 70 kPa, 30 kPa to 80 kPa, 30 kPa to 70 kPa, 35 kPa to 80 kPa, or 35 kPa to 70 kPa at 10% deformation, and may have excellent mechanical strength. Here, the compressive strength may be measured by preparing a specimen according to the ASTM C165 standard.

In the present disclosure, the aerogel composite has a tensile strength of 30 N/cm$^2$ to 60 N/cm$^2$, 40 N/cm$^2$ to 55 N/cm$^2$, or 45 N/cm$^2$ to 55 N/cm$^2$, and may have excellent flexibility. Here, the tensile strength may be measured by preparing a specimen according to the ASTM D638 standard.

In the present disclosure, the aerogel composite may be generally formed by preparing a silica sol, impregnating a fiber substrate with the silica sol, and then performing gelation thereon, and drying the same. Hereinafter, each step will be described. However, the specific preparation processes or examples thereof described herein are not intended to be limited to any particular type of aerogel or preparation method thereof. The present disclosure may include any aerogel formed by any associated preparation method known to those skilled in the art.

Preparation of Silica Sol

In the present disclosure, a silica precursor composition and a catalyst composition may be mixed to prepare a silica sol.

In the present disclosure, the silica precursor composition may include water and/or a polar organic solvent in a silica precursor.

In the present disclosure, the silica precursor may be used without limitation as long as it is a precursor which may be used to form a silica aerogel, and for example, may be a silicon-containing alkoxide-based compound. Specifically, the silica precursor may be tetra alkyl silicate such as tetramethyl orthosilicate (TMOS), tetraethyl orthosilicate (TEOS), methyl triethyl orthosilicate, dimethyl diethyl orthosilicate, tetrapropyl orthosilicate, tetraisopropyl orthosilicate, tetrabutyl orthosilicate, tetra secondary butyl orthosilicate, tetra tertiary butyl orthosilicate, tetrahexyl orthosilicate, tetracyclohexyl orthosilicate, and tetradodecyl orthosilicate. Among these, more specifically, in the case of the present disclosure, the silica precursor may be tetramethyl orthosilicate (TMOS), tetraethyl orthosilicate (TEOS), or a mixture thereof.

In addition, in the present disclosure, the silica precursor may be a water glass solution. Here, the water glass solution may be a diluted solution in which distilled water is added to water glass and then mixed therewith, and the water glass may be sodium silicate ($Na_2SiO_3$) which is an alkali silicate salt obtained by melting silicon dioxide ($SiO_2$) and alkali.

In addition, in the present disclosure, the silica precursor may include a pre-hydrolyzed TEOS (HTEOS). The HTEOS is an ethyl silicate oligomer material having a wide molecular weight distribution, and when synthesized into an oligomer form from a TEOS monomer, physical properties such as gelation time may be adjusted, and thus, may be easily applied according to a user's reaction conditions. In addition, there is an advantage in that reproducible physical properties of a final product may be created. The HTEOS may typically be synthesized by a condensation reaction of TEOS which has undergone a partial hydration step under acidic conditions. That is, the HTEOS is in the form of an oligomer prepared by condensing TEOS, wherein the oligomer is partially hydrated.

In the present disclosure, the silica concentration of the silica precursor composition may be 10 kg/m$^3$ to 100 kg/m$^3$, 20 kg/m$^3$ to 80 kg/m$^3$, 30 kg/m$^3$ to 70 kg/m$^3$, 30 kg/m$^3$ to 60 kg/m$^3$, or 35 kg/m$^3$ to 45 kg/m$^3$, but is not limited thereto. In the present disclosure, the silica concentration is the concentration of the silica included in the silica precursor with respect to the silica precursor composition, and may be suitably adjusted by varying the contents of a silica precursor, an organic solvent, and water.

In the present disclosure, the silica precursor may be used in an amount such that the content of the silica included in the silica sol is to be 0.1 wt % to 30 wt %, but is not limited thereto. If the content of the silica satisfies the above range, it is preferable in terms of securing mechanical physical properties, flexibility in particular, of the aerogel composite at an excellent level while having an improved heat insulation effect.

In the present disclosure, the polar organic solvent may include an alcohol, and specific examples thereof may include a monohydric alcohol such as methanol, ethanol, isopropanol, and butanol, a polyhydric alcohol such as glycerol, ethylene glycol, propylene glycol, diethylene glycol, dipropylene glycol, and sorbitol, or a combination thereof, but other solvents as known to those skilled in the art may also be used without limitation. In the present disclosure, when considering the miscibility with water and aerogel, the polar organic solvent may be a monohydric alcohol having 1 to 6 carbon atoms such as methanol, ethanol, isopropanol, and butanol, and may be, for example, ethanol.

In the present disclosure, the polar organic solvent may be used in an appropriate amount by those skilled in the art in consideration of the degree of hydrophobicity in an aerogel composite to be finally prepared while promoting a surface modification reaction.

In the present disclosure, in order to prepare a pre-hydrolyzed silica precursor when preparing the silica precursor composition, the silica precursor and water may be mixed and prepared at a weight ratio of 1:0.5 to 10, 1:1 to 8, or 1:3 to 6, but are not limited thereto.

In addition, in the present disclosure, when a pre-hydrolyzed silica precursor (for example, a pre-hydrolyzed TEOS) is included as a silica precursor when preparing the silica precursor composition, in order to satisfy the silica concentration, the pre-hydrolyzed silica precursor (for example, the pre-hydrolyzed TEOS) and an organic solvent may be mixed and prepared at a weight ratio of 1:0.5 to 3.5, but are not limited thereto.

In the present disclosure, the weight ratio of the pre-hydrolyzed silica precursor and the organic solvent may be suitably adjusted within the above-described range such that the weight ratio of the fiber substrate with respect to the aerogel in the finally prepared aerogel composite is to be 1:0.35 to 2, preferably 1:0.4 to 2, or 1:0.4 to 1, and more preferably 1:0.45 to 1.

In the present disclosure, the silica precursor composition may further include an acid catalyst, and specifically, may further include an acid catalyst when applying an alkoxy silane-based compound, which is not a hydrolysate, as a precursor. At this time, the acid catalyst may be used without limitation as long as it is an acid catalyst which allows the pH to be 3 or less, and as an example, a hydrochloric acid, a nitric acid, a sulfuric acid, a phosphoric acid, an oxalic acid, or an acetic acid may be used. At this time, the acid catalyst may be added in an amount which allows the pH of the sol to be 3 or less, and may be added in the form of an aqueous solution in which the acid catalyst is dissolved in an aqueous solvent.

In the present disclosure, the catalyst composition may include, as a base catalyst, an inorganic base such as sodium hydroxide or potassium hydroxide, or an organic base such as ammonium hydroxide. Specific examples thereof may include sodium hydroxide (NaOH), potassium hydroxide (KOH), calcium hydroxide $(Ca(OH)_2)$, ammonia $(NH_3)$, ammonium hydroxide $(NH_4OH$; ammonia water), tetramethylammonium hydroxide (TMAH), tetraethylammonium hydroxide (TEAH), tetrapropylammonium hydroxide (TPAH), tetrabutylammonium hydroxide (TBAH), methylamine, ethylamine, isopropylamine, monoisopropylamine, diethylamine, diisopropylamine, dibutylamine, trimethylamine, triethylamine, triisopropylamine, tributylamine, choline, monoethanolamine, diethanolamine, 2-aminoethanol, 2-(ethyl amino) ethanol, 2-(methyl amino) ethanol, N-methyl diethanolamine, dimethylaminoethanol, diethylaminoethanol, nitrilotriethanol, 2-(2-aminoethoxy) ethanol, 1-amino-2-propanol, triethanolamine, monopropanolamine, dibutanolamine, pyridine, a combination thereof, or the like, but are not limited thereto.

In the present disclosure, the base catalyst may be included in an amount which allows the pH of the sol to be 5 to 9. If the pH of the sol is out of the above range, gelation may not be easily achieved or a gelation rate may be too low, so that processability may be degraded. In addition, since the base may be precipitated when introduced in a solid phase, it may be preferable that the base is added in a solution phase diluted by an aqueous solvent or the above-described organic solvent. At this time, the dilution ratio of the base catalyst and the organic solvent, specifically an alcohol, may be 1:4 to 1:100 based on a volume basis, but is not limited thereto.

In the present disclosure, in order to prepare the silica sol, the silica precursor composition and the catalyst composition may be mixed at a volume ratio of 1:0.01 to 10.0, 1:0.01 to 5.0, or 1:0.01 to 2.0, but is not limited thereto.

In the present disclosure, when preparing the silica sol, silica aerogel powder including one or more organic functional groups is added together with the above-described silica precursor to allow a hydrophobic group to be present even inside pores during aerogel gelation, thereby increasing hydrophobicity retention, especially at high temperatures.

In the present disclosure, the aerogel powder may be prepared by preparing a silica sol using an alkoxy silane such as tetraethylorthosilicate (TEOS), followed by gelling the silica sol, performing surface modification using a surface modifier such as an alkyltrichlorosilane such as methyltrichlorosilane, a dialkyldichlorosilane such as dimethyldichlorosilane, a trialkyl chlorosilane such as trimethyl chlorosilane, a symmetrical disiloxane such as hexamethyldisiloxane or hexaalkyldisiloxane, a trialkylalkoxysilane such as trimethyl ethoxysilane, or a silazane such as hexamethyldisilazane, and then sequentially performing supercritical drying and normal-pressure drying processes. Here, the composition of a silica precursor, a catalyst composition, and an organic solvent for preparing the silica sol, gelation conditions, and the like overlap those of the preparation process of the aerogel composite according to the present disclosure, and thus, detailed descriptions thereof will be omitted.

In the present disclosure, the average particle size of the aerogel powder may be 10 µm to 100 µm, preferably 10 µm to 60 µm, but is not limited thereto.

In order to achieve the above-described object, in the present disclosure, the aerogel powder may be added in an amount of 5 parts by weight to 30 parts by weight, preferably 5 parts by weight to 15 parts by weight, based on 100 parts by weight of silica included in the silica sol. In the present disclosure, if the addition amount of the aerogel powder is less than the above-described range, it is difficult to expect a desired effect, and if greater than the above-described range, the strength of the aerogel composite may be degraded.

In addition, in the present disclosure, an additive may be further added to the silica sol if necessary. At this time, all known additives which may be added when preparing aerogel may be applied as the additive, and for example, an additive such as an opacifying agent and a flame retardant may be used.

In the present disclosure, the additive may be added in an amount of 0.1 wt % to 10 wt %, 0.1 wt % to 7 wt %, 0.5 wt % to 7 wt %, or 0.5 wt % to 5 wt % based on the silica content of the aerogel, but is not limited thereto.

Gelation of Silica Sol

In the present disclosure, after the silica sol is impregnated into the substrate, the silica sol may be subjected to gelation.

In the present disclosure, the impregnation process is a process of allowing a catalyzed silica sol to permeate into pores inside the substrate, and may be performed by introducing the catalyzed silica sol and the substrate into a reaction vessel, or may be performed by spraying the catalyzed silica sol on the substrate which is moving on a conveyor belt according to a roll-to-roll process. At this time, in order to improve the bonding between the substrate and the silica sol, the substrate may be lightly pressed down to be sufficiently impregnated. Thereafter, the substrate may be pressed to a predetermined thickness with a predetermined pressure to remove excess silica sol, so that drying time may be reduced.

In the present disclosure, the temperature of the silica sol in the reaction vessel may be 10° C. to 40° C., 20° C. to 40° C., 25° C. to 40° C., 30° C. to 40° C., or 35° C. to 45° C. When the temperature of the silica sol in the reaction vessel satisfies the above range, it is preferable in that the above-described viscosity range of the catalyzed sol may be more easily achieved, and even the retention time is relatively short, a desired level of viscosity range may be achieved.

In the present disclosure, the catalyzed silica sol may be impregnated into the substrate at a volume ratio of 0.1 to 10:1 (catalyzed silica sol:substrate), a volume ratio of 0.1 to 1:1, a volume ratio of 0.3 to 1:1, a volume ratio of 0.5 to 1:1, or a volume ratio of 0.6 to 1:1, and preferably, may be impregnated thereinto at a volume ratio of 1:1, but the present disclosure is not limited thereto.

In the present disclosure, the silica sol impregnated into the substrate may be subjected to gelation simultaneously with the impregnation process of the silica sol or sequentially after the impregnation process.

In the present disclosure, the "gelation" may refer to a sol-gel reaction, and the "sol-gel reaction" may be forming a network structure from a silicon unit precursor material. Here, the network structure may be a planar mesh structure in which specific polygons having one or more types of atomic arrangement are linked to each other, or a structure in which specific polyhedrons share their vertices, edges, faces, and the like with each other to form a three-dimensional skeletal structure.

In the present disclosure, the substrate impregnated with the catalyzed sol may be subjected to gelation on a moving element such as a conveyor belt.

In the present disclosure, the gelation may be performed under an ambient atmosphere temperature of 20° C. to 40° C., 25° C. to 40° C., 30° C. to 40° C., or 35° C. to 40° C. on the conveyor belt, and it is particularly preferable that the gelation is performed under an ambient atmosphere temperature of 30° C. to 40° C. or 35° C. to 40° C. in terms of increasing the strength of aerogel and pores.

In addition, in the present disclosure, the gelation time may be 1 minute to 120 minutes, 1 minute to 100 minutes, 1 minute to 60 minutes, 5 minutes to 60 minutes, 5 minutes to 40 minutes, 10 minutes to 40 minutes, 10 minutes to 30 minutes, or 10 minutes to 20 minutes, but is not limited thereto.

Aging of Gelled Wet Gel Composite

In the present disclosure, if necessary, an aging step may be further included, which is leaving the wet gel composite obtained by gelation as described above to stand at an appropriate temperature so as to achieve a complete chemical change. In the aging step, the network structure formed by the gelation may be more firmly formed, so that the mechanical stability of the aerogel composite may be improved.

In the present disclosure, the aging step may be performed by leaving the gelled wet gel composite to stand as it is at an appropriate temperature, or may be performed by adding a cross-linking-promoting compound.

In addition, in the present disclosure, the aging step may be performed by adding a solution in which a base catalyst such as sodium hydroxide (NaOH), potassium hydroxide (KOH), ammonium hydroxide ($NH_4OH$), triethylamine, pyridine, or the like is diluted to a concentration of 1% to 10% in an organic solvent, in the presence of the wet gel composite. In this case, a Si—O—Si bonding in aerogel is induced to the maximum to allow the network structure of a silica gel to be firmer, so that there is an effect of facilitating the maintenance of the pore structure in a drying process be performed later. At this time, the organic solvent may be the alcohol described above, and specifically, may include ethanol.

In the present disclosure, the aging step may be performed by leaving the gelled wet gel composite to stand at a temperature of 30° C. to 80° C., 40° C. to 80° C., or 50° C. to 80° C. for 0.1 hours to 20 hours, 0.5 hours to 15 hours, 0.5 hours to 10 hours, 0.5 hours to 7 hours, or 1 hour to 5 hours to strengthen the pore structure, and within this range, it is possible to prevent an increase in production costs by preventing a loss of the solvent due to evaporation while preventing a decrease in productivity.

In addition, in the present disclosure, the aging step may be performed by performing primary aging of leaving the gelled wet gel composite at 30° C. to 80° C. for 0.1 hours to 5 hours to strengthen the pore structure, and then performing secondary aging at 30° C. to 80° C. for 0.1 hours to 20 hours, 0.5 hours to 15 hours, 0.5 hours to 10 hours, 0.5 hours to 7 hours, or 1 hour to 5 hours, in the presence of a solution in which the base catalyst is diluted to a concentration of 1% to 10% in an organic solvent.

In the present disclosure, the aging step may be performed in a separate reaction vessel after recovering the gelled wet gel composite, or may be performed inside the reaction vessel in which the gelation step has been performed.

Surface Modification of Wet Gel Composite

In the present disclosure, if necessary, a surface modification step of hydrophobizing the surface of the wet gel composite obtained by the gelation as described above or the surface of the aged wet gel composite may be further included in the presence of a surface modifier.

In the present disclosure, as the surface modifier, a compound which hydrophobizes the surface of a wet gel may be applied without limitation, which may be, for example, a silane-based compound, a siloxane-based compound, a silanol-based compound, a silazane-based compound, or a combination thereof. Specific examples thereof may be a silane-based compound such as trimethylchlorosilane (TMCS), dimethyldimethoxysilane, dimethyldiethoxysilane, methyltrimethoxysilane (MTMS), methyltriethoxysilane (MTES), trimethylethoxysilane (TMES), vinyltrimethoxysilane, ethyltriethoxysilane, phenyltriethoxysilane, phenyltrimethoxysilane, tetraethoxysilane, dimethyldichlorosilane, and 3-aminopropyltriethoxysilane, a siloxane-based compound such as polydimethyl siloxane, polydiethyl siloxane, and octamethyl cyclotetra siloxane, a silanol-based compound such as trimethylsilanol, triethylsilanol, triphenyl silanol, and t-butyldimethylsilanol, a silazane-based compound such as 1,2-diethyldisilazane, 1,1,2,2-tetramethyldisilazane, 1,1,3,3-tetramethyldisilazane, 1,1,1,2,2,2-hexamethyldisilazane (HMDS), 1,1,2,2-tetraethyldisilazane, and 1,2-diisopropyldisilazane, or a combination thereof, but are not limited thereto.

In the present disclosure, the surface modifier may be used in a solution phase diluted in an organic solvent. Here, the organic solvent may be an alcohol (an organic solvent), and at this time, the surface modifier may be diluted to 1 vol % to 15 vol % based on the total volume of the diluted solution.

In addition, in the present disclosure, the surface modifier may be added in an amount of 0.01 vol % to 90 vol % with respect to the wet gel composite for a sufficient surface modification effect, but is not limited thereto.

In the present disclosure, the surface modification step may be performed at a temperature of 50° C. to 90° C. or 50° C. to 80° C. for 1 hour to 24 hours, but is not limited thereto.

Drying (or Drying and Surface Modification)

In the present disclosure, a drying step of drying the wet gel composite to obtain an aerogel composite may be included.

In the present disclosure, the drying is performed as a process of removing only the solvent while maintaining the pore structure of the aged gel, and may be performed, for example, by supercritical drying and/or normal-pressure drying.

In the present disclosure, the supercritical drying process is performed using supercritical carbon dioxide, and for example, may be performed by placing the aged wet gel composite in a supercritical drying reactor, filling the reactor with $CO_2$ in a liquid state, performing a solvent replacement process of replacing an alcohol solvent inside the wet gel with $CO_2$, followed by raising the temperature to a temperature of 40° C. to 70° C. at a predetermined temperature increase rate, for example, a rate of 0.1° C./min to 1° C./min, and then maintaining a pressure equal to or higher than the pressure at which carbon dioxide becomes supercritical, for example, a pressure of 100 bar to 150 bar, thereby maintaining the supercritical state of carbon dioxide for a predetermined period of time, specifically, 20 minutes to 1 hour. In general, carbon dioxide becomes supercritical at a temperature of 31° C., and a pressure of 73.8 bar. After the predetermined temperature and the predetermined pressure at which carbon dioxide becomes supercritical are maintained for 2 hours to 12 hours, more specifically, 2 hours to 6 hours, the pressure is gradually removed to complete the supercritical drying process, thereby preparing an aerogel composite, but the present disclosure is not limited thereto.

In addition, in the present disclosure, the normal-pressure drying process may be performed according to a typical method such as hot air drying or IR drying at a temperature of 70° C. to 200° C. and under a normal pressure (1±0.3 atm), but is not limited thereto.

However, the present disclosure may include not only a method for drying a surface-modified wet gel composite, but also a method for performing surface modification during supercritical drying of an aged or unaged wet gel composite.

In the present disclosure, if surface modification is performed during supercritical drying as described above, a surface modifier may be introduced when the solvent extraction rate is 70 wt % or greater, 75 wt % or greater, or 80 wt % or greater during the supercritical drying. Since the surface modifier is introduced when the solvent extraction rate in a supercritical extractor falls within the above-described range, the aerogel composite may have excellent hydrophobicity, and particularly, an aerogel composite with excellent hydrophobicity retention even under a high-temperature environment may be prepared.

Here, the "solvent extraction rate" is a ratio of the amount of solvent recovered from a lower portion of an extractor in the supercritical drying step relative to the total amount of solvent included in the wet gel composite, which may be calculated by Equation 5 below.

Solvent extraction rate (%)=[(Amount of solvent discharged and recovered from extractor)/(Amount of solvent in wet gel composite introduced into extractor)]×100(%)  [Equation 5]

In Equation 5 above, the weight of the solvent discharged and recovered from the extractor is the weight of the solvent obtained from an extracted solvent separator after drying, and the total amount of the solvent included in the wet gel composite is the difference between the weight of the aerogel composite after the drying and the weight of the wet gel composite before the drying.

In the present disclosure, as the surface modifier, a compound which hydrophobizes the surface of a wet gel may be applied without limitation, which may be, for example, a silane-based compound, a siloxane-based compound, a silanol-based compound, a silazane-based compound, or a combination thereof. Specific examples thereof may be a silane-based compound such as trimethylchlorosilane (TMCS), dimethyldimethoxysilane, dimethyldiethoxysilane, methyltrimethoxysilane (MTMS), methyltriethoxysilane (MTES), trimethylethoxysilane (TMES), vinyltrimethoxysilane, ethyltriethoxysilane, phenyltriethoxysilane, phenyltrimethoxysilane, tetraethoxysilane, dimethyldichlorosilane, and 3-aminopropyltriethoxysilane, a siloxane-based compound such as polydimethyl siloxane, polydiethyl siloxane, and octamethyl cyclotetra siloxane, a silanol-based compound such as trimethylsilanol, triethylsilanol, triphenyl silanol, and t-butyldimethylsilanol, a silazane-based compound such as 1,2-diethyldisilazane, 1,1,2,2-tetramethyldisilazane, 1,1,3,3-tetramethyldisilazane, 1,1,1,2,2,2-hexamethyldisilazane (HMDS), 1,1,2,2-tetraethyldisilazane, and 1,2-diisopropyldisilazane, or a combination thereof, but are not limited thereto.

In the present disclosure, the surface modifier may be added in an amount of 1 part by weight to 20 parts by weight, preferably 5 parts by weight to 15 parts by weight, based on 100 parts by weight of wet gel, but is not limited thereto. Here, the weight of the wet gel refers to the weight of the wet gel itself, excluding the weight of the fiber substrate.

In the present disclosure, the solvent used in the supercritical drying may be the solvent previously used in the preparation of the wet gel composite, and may include water and an organic solvent. In addition, the organic solvent may specifically be an alcohol, and at this time, the alcohol may be a monohydric alcohol such as methanol, ethanol, isopropanol, and butanol, or a polyhydric alcohol such as glycerol, ethylene glycol, propylene glycol, diethylene glycol, dipropylene glycol, and sorbitol, and any one thereof or a mixture of two or more thereof may be used. Among the above, when considering the miscibility with water and aerogel, the alcohol may be a monohydric alcohol having 1 to 6 carbon atoms such as methanol, ethanol, isopropanol, and butanol, and preferably, may be ethanol.

In addition, the solvent may include an organic solvent in an amount of 85 wt % to 95 wt % and water in an amount of 5 wt % to 15 wt %.

In addition, in the present disclosure, when the wet gel composite is introduced into the supercritical extractor during the supercritical drying, it is preferable that the wet gel composite is introduced to be 50 vol % or greater based on 100 vol % of the volume of the supercritical extractor because an environment may be created in which all the remaining solvent may be converted to a supercritical state when the surface modifier is added later.

In the present disclosure, it is preferable that the silica sol preparation step, the impregnation step, the drying step including the surface modification described above are designed such that a fiber per unit volume of an aerogel composite prepared after final drying is to be included in 2% to 12%, or in 5% to 10%, the volume ratio of the remaining portion other than the fibers, i.e., aerogel including pores and voids between discrete fibers is 88% to 98%, or 90% to 95%, and additionally, a fiber substrate and aerogel are included at a weight ratio of 1:0.4 to 2, preferably 1:0.4 to 1, or 1:0.45. In an aerogel composite, it is preferable that fibers, voids, and aerogel including pores are included in the volume ratio described above to achieve excellent heat insulation, excellent hydrophobicity even inside the pores or voids, and excellent ability to withstand high temperatures, that is, thermal stability.

As such, the aerogel composite provided in the present disclosure has excellent high-temperature heat insulation properties, and thus, may exhibit excellent heat blocking ability when applied as an insulation material to high-temperature pipes, battery modules of electric vehicles, or the like.

In accordance with another exemplary aspect of the present disclosure, a heat insulation member includes the aerogel composite provided in the present disclosure.

In the present disclosure, the heat insulation member may include the above-described aerogel composite, and a support member positioned on at least one surface of both surfaces of the aerogel composite.

In the present disclosure, the support member may be, for example, a film-like support member, a sheet-like support member, a foil-like support member, a porous support member, and the like.

In the present disclosure, the film-like support member is formed by molding a polymer raw material into a thin film, and may be an organic film made of polyethylene terephthalate (PET), polyester, polycarbonate (PC), polyimide (PI), polyethylene naphthalate (PEN), polyether ether ketone (PEEK), polyarylate (PAR), polycylicolefin (PCO), polynorbornene, polyethersulphone (PES), cycloolefin polymer (COP), or the like, a glass film, and the like (also includes a metal-deposited film).

In the present disclosure, the sheet-like support member is formed by molding an organic, inorganic, or metallic fibrous raw material, and examples thereof may include paper, a non-woven fabric (including a glass mat), an organic fiber fabric, glass cloth, and the like.

In the present disclosure, the foil-like support member is formed by molding a metal raw material into a thin film, and examples thereof may include an aluminum foil, a copper foil, and the like.

In the present disclosure, the porous support member has a porous structure made of an organic, inorganic, or metal raw material, and examples thereof may include a porous organic material (e.g., polyurethane foam), a porous inorganic material (e.g., a zeolite sheet), a porous metal material (e.g., a porous metal sheet, a porous aluminum sheet), and the like.

In the present disclosure, the support member may be a single layer, or may have a multi-layered structure of two or more layers.

In the present disclosure, the thickness of the support member is not particularly limited, and may be, for example, 0.1 μm to 100 μm, or 1 μm to 50 μm.

In addition, in the present disclosure, a pressure-sensitive adhesive layer or an adhesive layer may be further included between an exposed surface of the aerogel composite and the support member.

In the present disclosure, the pressure-sensitive adhesive layer or the adhesive layer may include an acrylic pressure-sensitive adhesive, a polyurethane pressure-sensitive adhesive, an olefin pressure-sensitive adhesive, an SBR rubber pressure-sensitive adhesive, or a silicone pressure-sensitive adhesive, but is not limited thereto.

In the present disclosure, the pressure-sensitive adhesive layer or the adhesive layer is not particularly limited, and may be, for example, 1 μm to 100 μm, or 10 μm to 50 μm.

In the present disclosure, the heat insulation member may also be applied to applications such as a heat insulation material, thermal insulation material, or non-combustible material in the construction field, aviation field, automobile field, batteries, home appliances, semiconductor field, industrial facilities, and the like.

In accordance with the present disclosure, a battery module or a battery pack comprises the aerogel composite provided in the present disclosure.

A battery module comprises a module case having an internal space and one or more battery cells present within the internal space. The number of battery cells accommodated in the module case is not particularly limited and may be adjusted according to the use of the battery module. The battery cells accommodated in the module case may be electrically connected to each other. The type of battery cells accommodated in the module case are not necessarily limited. For example, the battery module may comprise cylindrical, prismatic, or pouch case battery cells.

The battery module may comprise an aerogel composite according to the present disclosure within the module case of the battery module. The aerogel composite may be positioned between battery cells accommodated within the module case. The aerogel composite may be positioned along a periphery of the module case, between the module case and the plurality of battery cells. The aerogel composite positioned within the module case may act as an insulator and reduce thermal propagation in the battery module, improving the safety of the battery module.

A battery pack may comprise one or more of the battery modules described above. In the battery pack, the battery modules may be electrically connected to each other. The battery pack may comprise the aerogel composite according to the present disclosure. For example, the aerogel composite may be positioned between battery modules of the battery pack. The aerogel composite may also at least partially surround the plurality of battery modules in the battery pack. The aerogel composite may act as an insulating material in the battery pack, reducing thermal propagation and improving the safety of the battery pack.

Hereinafter, the present disclosure will be described in detail with reference to the following examples. However, the following examples are illustrative of the present disclosure, and the contents of the present disclosure are not limited by the following examples.

EXAMPLES

[Preparation Example 1] Preparation of Aerogel Powder

Tetraethyl orthosilicate (TEOS) and water were mixed in a molar ratio of 1:4 and ethanol having a weight ratio of 1:1 with respect to TEOS was added thereto to prepare a silica precursor solution. In order to promote hydrolysis of the silica precursor solution, an acid was added such that the pH of the silica precursor solution was to be 3 or less, and the mixture was stirred for 2 hours or more to prepare a hydrated TEOS solution. Ethanol having a weight ratio of 1:1.67 with respect to the hydrated TEOS solution was added to prepare a silica sol. A base catalyst solution (5 wt % of NaOH aqueous solution) having a volume ratio of 99:1 with respect to the obtained silica sol was added to prepare a catalyzed sol. The catalyzed sol was placed in a container to be subjected to gelation. To gelled wet gel, 90 vol % of a solution (2 vol %) prepared as a surface modifier by diluting trimethylethoxysilane (TMES) in ethanol was added based on the volume of the wet gel, and then surface modification was performed thereon for 12 hours at a temperature of 75° C. At this time, in order to increase the surface modification efficiency, the wet gel in a monolith form may be cut into pieces with a size of several centimeters, and then subjected to the surface modification. After the surface modification was completed, the wet gel was placed in a 70 L supercritical extractor, and $CO_2$ was continuously injected thereto at 28° C. and 70 bar for 10 minutes at a rate of 70 L/min. Thereafter, the temperature inside the extractor was raised to 50° C. over the course of 1 hour and 20 minutes, and upon reaching 50° C. and 150 bar, $CO_2$ was continuously injected thereto for 20 minutes at a rate of 5 L/min. At this time, the ethanol was recovered through the bottom of a separator. After 20 minutes of resting, supercritical drying was performed by continuously injecting $CO_2$ at a rate of 5 L/min over the course of 20 minutes. Thereafter, $CO_2$ was vented over the course of 2 hours, resulting in preparing silica aerogel. The prepared silica aerogel was pulverized using a ZM 200 ultra centrifugal mill by RETSCH Co. to prepare hydrophobic aerogel powder classified to have an average particle size in the range of 10 μm to 100 μm.

[Example 1] Preparation of Aerogel Composite

Tetraethyl orthosilicate (TEOS) and water were mixed in a molar ratio of 1:4 and ethanol having a weight ratio of 1:1 with respect to TEOS was added thereto to prepare a silica precursor solution. In order to promote hydrolysis of the silica precursor solution, an acid was added such that the pH of the silica precursor solution was to be 3 or less and stirred for 2 hours or more to prepare a hydrated TEOS solution. Ethanol having a weight ratio of 1:0.73 with respect to the hydrated TEOS solution was added to prepare a silica sol. Thereafter, the prepared aerogel powder was added to the prepared silica sol in an amount of 10 parts by weight based on 100 parts by weight of silica in the silica sol. A base catalyst solution (5 wt % of NaOH aqueous solution) having a volume ratio of 99:1 with respect to the obtained silica sol was added to prepare a catalyzed sol. After filling the catalyzed sol in an impregnation tank, a fiber substrate (glass fiber mat, 5 mm) was impregnated with the catalyzed sol. The fiber substrate which passed through the impregnation tank to allow the catalyzed sol to infiltrate thereinto was gelled while moving on a conveyor belt at a predetermined rate. At this time, the ambient atmosphere temperature at the top of the conveyor belt was maintained at 30° C. The prepared wet gel composite was put into a supercritical extractor, and then the temperature was raised to 70° C. and the pressure was raised to 150 bar, and the raised temperature was maintained for 20 minutes. Thereafter, supercritical carbon dioxide was continuously injected for 20 minutes to extract the solvent, which was left at rest (left to stand) for 20 minutes. After repeating the supercritical carbon dioxide injection and the resting one more time, and continuously injecting the supercritical carbon dioxide for the third time, hexamethyldisilazane (HMDS) was introduced in an amount of 5 parts by weight based on 100 parts by weight of the wet gel. When the hexamethyldisilazane was introduced, the solvent extraction rate was 85 wt %. Thereafter, the resting state was maintained for 20 minutes, and then the supercritical carbon dioxide was continuously injected. Thereafter, the pressure was reduced to normal pressure and the supercritical drying was completed. At this time, the supercritical drying took a total of 4 hours. Thereafter, additional normal-pressure drying was performed in an oven at 150° C. to prepare an aerogel composite.

[Example 2] Preparation of Aerogel Composite

Tetraethyl orthosilicate (TEOS) and water were mixed in a molar ratio of 1:4 and ethanol having a weight ratio of 1:1 with respect to TEOS was added thereto to prepare a silica precursor solution. In order to promote hydrolysis of the silica precursor solution, an acid was added such that the pH of the silica precursor solution was to be 3 or less and stirred for 2 hours or more to prepare a hydrated TEOS solution. Ethanol having a weight ratio of 1:1.1 with respect to the hydrated TEOS solution was added to prepare a silica sol. Thereafter, the prepared aerogel powder was added to the prepared silica sol in an amount of 15 parts by weight based on 100 parts by weight of silica in the silica sol. A base catalyst solution (5 wt % of NaOH aqueous solution) having a volume ratio of 99:1 with respect to the obtained silica sol was added to prepare a catalyzed sol. After filling the catalyzed sol in an impregnation tank, a fiber substrate (glass fiber mat, 5 mm) was impregnated with the catalyzed sol. The fiber substrate which passed through the impregnation tank to allow the catalyzed sol to infiltrate thereinto was gelled while moving on a conveyor belt at a predetermined rate. At this time, the ambient atmosphere temperature at the top of the conveyor belt was maintained at 40° C. The prepared wet gel composite was put into a supercritical extractor, and then the temperature was raised to 70° C. and the pressure was raised to 150 bar, and the raised temperature was maintained for 20 minutes. Thereafter, supercritical carbon dioxide was continuously injected for 20 minutes to extract the solvent, which was left at rest (left to stand) for 20 minutes. After repeating the supercritical carbon dioxide injection and the resting one more time, and continuously injecting the supercritical carbon dioxide for the third time, hexamethyldisilazane (HMDS) was introduced in an amount of 10 parts by weight based on 100 parts by weight of the wet gel. When the hexamethyldisilazane was introduced, the solvent extraction rate was 75 wt %. Thereafter, the resting state was maintained for 20 minutes, and then the supercritical carbon dioxide was continuously injected. Thereafter, the pressure was reduced to normal pressure and the supercritical drying was completed. At this time, the supercritical drying took a total of 4 hours. Thereafter, additional normal-pressure drying was performed in an oven at 150° C. to prepare an aerogel composite.

[Example 3] Preparation of Aerogel Composite

Tetraethyl orthosilicate (TEOS) and water were mixed in a molar ratio of 1:4 and ethanol having a weight ratio of 1:1 with respect to TEOS was added thereto to prepare a silica precursor solution. In order to promote hydrolysis of the silica precursor solution, an acid was added such that the pH of the silica precursor solution was to be 3 or less and stirred for 2 hours or more to prepare a hydrated TEOS solution. Ethanol having a weight ratio of 1:1.5 with respect to the hydrated TEOS solution was added to prepare a silica sol. Thereafter, the prepared aerogel powder was added to the prepared silica sol in an amount of 5 parts by weight based on 100 parts by weight of silica in the silica sol. A base catalyst solution (5 wt % of NaOH aqueous solution) having a volume ratio of 99:1 with respect to the obtained silica sol was added to prepare a catalyzed sol. After filling the catalyzed sol in an impregnation tank, a fiber substrate (glass fiber mat, 5 mm) was impregnated with the catalyzed sol. The fiber substrate which passed through the impregnation tank to allow the catalyzed sol to infiltrate thereinto was gelled while moving on a conveyor belt at a predetermined rate. At this time, the ambient atmosphere temperature at the top of the conveyor belt was maintained at 35° C. The prepared wet gel composite was put into a supercritical extractor, and then the temperature was raised to 70° C. and the pressure was raised to 150 bar, and the raised temperature was maintained for 20 minutes. Thereafter, supercritical carbon dioxide was continuously injected for 20 minutes to extract the solvent, which was left at rest (left to stand) for 20 minutes. After repeating the supercritical carbon dioxide injection and the resting one more time, and continuously injecting the supercritical carbon dioxide for the third time, hexamethyldisilazane (HMDS) was introduced in an amount of 5 parts by weight based on 100 parts by weight of the wet gel. When the hexamethyldisilazane was introduced, the solvent extraction rate was 70 wt %. Thereafter, the resting state was maintained for 20 minutes, and then the supercritical carbon dioxide was continuously injected. Thereafter, the pressure was reduced to normal pressure and the supercritical drying was completed. At this time, the supercritical drying took a total of 4 hours. Thereafter, additional normal-pressure drying was performed in an oven at 150° C. to prepare an aerogel composite.

[Example 4] Preparation of Aerogel Composite

Tetraethyl orthosilicate (TEOS) and water were mixed in a molar ratio of 1:4 and ethanol having a weight ratio of 1:1 with respect to TEOS was added thereto to prepare a silica precursor solution. In order to promote hydrolysis of the silica precursor solution, an acid was added such that the pH of the silica precursor solution was to be 3 or less and stirred for 2 hours or more to prepare a hydrated TEOS solution. Ethanol having a weight ratio of 1:1.33 with respect to the hydrated TEOS solution was added to prepare a silica sol. Thereafter, the prepared aerogel powder was added to the prepared silica sol in an amount of 5 parts by weight based on 100 parts by weight of silica in the silica sol. A base catalyst solution (5 wt % of NaOH aqueous solution) having a volume ratio of 99:1 with respect to the obtained silica sol was added to prepare a catalyzed sol. After filling the catalyzed sol in an impregnation tank, a fiber substrate (glass fiber mat, 5 mm) was impregnated with the catalyzed sol. The fiber substrate which passed through the impregnation tank to allow the catalyzed sol to infiltrate thereinto was gelled while moving on a conveyor belt at a predetermined rate. At this time, the ambient atmosphere temperature at the top of the conveyor belt was maintained at 40° C. The prepared wet gel composite was put into a supercritical extractor, and then the temperature was raised to 70° C. and the pressure was raised to 150 bar, and the raised temperature was maintained for 20 minutes. Thereafter, supercritical carbon dioxide was continuously injected for 20 minutes to extract the solvent, which was left at rest (left to stand) for 20 minutes. After repeating the supercritical carbon dioxide injection and the resting one more time, and continuously injecting the supercritical carbon dioxide for the third time, hexamethyldisilazane (HMDS) was introduced in an amount of 5 parts by weight based on 100 parts by weight of the wet gel. When the hexamethyldisilazane was introduced, the solvent extraction rate was 75 wt %. Thereafter, the resting state was maintained for 20 minutes, and then the supercritical carbon dioxide was continuously injected. Thereafter, the pressure was reduced to normal pressure and the supercritical drying was completed. At this time, the supercritical drying took a total of 4 hours. Thereafter, additional normal-pressure drying was performed in an oven at 150° C. to prepare an aerogel composite.

[Example 5] Preparation of Aerogel Composite

Tetraethyl orthosilicate (TEOS) and water were mixed in a molar ratio of 1:4 and ethanol having a weight ratio of 1:1 with respect to TEOS was added thereto to prepare a silica precursor solution. In order to promote hydrolysis of the silica precursor solution, an acid was added such that the pH of the silica precursor solution was to be 3 or less and stirred for 2 hours or more to prepare a hydrated TEOS solution. Ethanol having a weight ratio of 1:1.4 with respect to the hydrated TEOS solution was added to prepare a silica sol. Thereafter, the prepared aerogel powder was added to the prepared silica sol in an amount of 10 parts by weight based on 100 parts by weight of silica in the silica sol. A base catalyst solution (5 wt % of NaOH aqueous solution) having a volume ratio of 99:1 with respect to the obtained silica sol was added to prepare a catalyzed sol. After filling the catalyzed sol in an impregnation tank, a fiber substrate (glass fiber mat, 5 mm) was impregnated with the catalyzed sol. The fiber substrate which passed through the impregnation tank to allow the catalyzed sol to infiltrate thereinto was gelled for while moving on a conveyor belt at a predetermined rate. At this time, the ambient atmosphere temperature at the top of the conveyor belt was maintained at 35° C. The prepared wet gel composite was put into a supercritical extractor, and then the temperature was raised to 70° C. and the pressure was raised to 150 bar, and the raised temperature was maintained for 20 minutes. Thereafter, supercritical carbon dioxide was continuously injected for 20 minutes to extract the solvent, which was left at rest (left to stand) for 20 minutes. After repeating the supercritical carbon dioxide injection and the resting one more time, and continuously injecting the supercritical carbon dioxide for the third time, hexamethyldisilazane (HMDS) was introduced in an amount of 10 parts by weight based on 100 parts by weight of the wet gel. When the hexamethyldisilazane was introduced, the solvent extraction rate was 80 wt %. Thereafter, the resting state was maintained for 20 minutes, and then the supercritical carbon dioxide was continuously injected. Thereafter, the pressure was reduced to normal pressure and the supercritical drying was completed. At this time, the supercritical drying took a total of 4 hours. Thereafter, additional normal-pressure drying was performed in an oven at 150° C. to prepare an aerogel composite.

[Comparative Example 1] Preparation of Aerogel Composite

Tetraethyl orthosilicate (TEOS) and water were mixed in a molar ratio of 1:4 and ethanol having a weight ratio of 1:1 with respect to TEOS was added thereto to prepare a silica precursor solution. In order to promote hydrolysis of the silica precursor solution, an acid was added such that the pH of the silica precursor solution was to be 3 or less and stirred for 2 hours or more to prepare a hydrated TEOS solution. Ethanol having a weight ratio of 1:2 with respect to the hydrated TEOS solution was added to prepare a silica sol. A base catalyst solution (5 wt % of NaOH aqueous solution) having a volume ratio of 99:1 with respect to the obtained silica sol was added to prepare a catalyzed sol. After filling the catalyzed sol in an impregnation tank, a fiber substrate (glass fiber mat, 5 mm) was impregnated with the catalyzed sol. The fiber substrate which passed through the impregnation tank to allow the catalyzed sol to infiltrate thereinto was gelled while moving on a conveyor belt at a predetermined rate. At this time, the ambient atmosphere temperature at the top of the conveyor belt was maintained at 30° C. The wet gel composite was added with 80 vol % of a hexamethyldisilazane (HMDS)/ethanol solution (volume ratio of 1:19) as a surface modifier based on the volume of the wet gel composite, and then was subjected to surface modification at a temperature of 70° C. for 3 hours. After the surface modification was completed, the wet gel composite was placed in a 70 L supercritical extractor and $CO_2$ was continuously injected thereto at 28° C. and 70 bar for 10 minutes at a rate of 70 L/min. Thereafter, the temperature inside the extractor was raised to 50° C. over the course of 1 hour and 20 minutes, and upon reaching 50° C. and 150 bar, $CO_2$ was continuously injected thereto for 20 minutes at a rate of 5 L/min. At this time, ethanol was recovered through the bottom of a separator. After 20 minutes of resting, supercritical drying was performed by continuously injecting $CO_2$ at a rate of 5 L/min over the course of 20 minutes. Thereafter, $CO_2$ was vented over the course of 2 hours to prepare a silica aerogel composite.

[Comparative Example 2] Preparation of Aerogel Composite

Tetraethyl orthosilicate (TEOS) and water were mixed in a molar ratio of 1:4 and ethanol having a weight ratio of 1:1 with respect to TEOS was added thereto to prepare a silica precursor solution. In order to promote hydrolysis of the silica precursor solution, an acid was added such that the pH of the silica precursor solution was to be 3 or less and stirred for 2 hours or more to prepare a hydrated TEOS solution. Ethanol having a weight ratio of 1:1.25 with respect to the hydrated TEOS solution was added to prepare a silica sol. A base catalyst solution (5 wt % of NaOH aqueous solution) having a volume ratio of 99:1 with respect to the obtained silica sol was added to prepare a catalyzed sol. After filling the catalyzed sol in an impregnation tank, a fiber substrate (glass fiber mat, 5 mm) was impregnated with the catalyzed sol at a volume ratio of 1:1. The fiber substrate which passed through the impregnation tank to allow the catalyzed sol to infiltrate thereinto was gelled while moving on a conveyor belt at a predetermined rate. At this time, the ambient atmosphere temperature at the top of the conveyor belt was maintained at 25° C. The prepared wet gel composite was put into a supercritical extractor, and then the temperature was raised to 70° C. and the pressure was raised to 150 bar, and the raised temperature was maintained for 20 minutes. Thereafter, supercritical carbon dioxide was continuously injected for 20 minutes to extract the solvent, which was left at rest (left to stand) for 20 minutes. After repeating the supercritical carbon dioxide injection and the resting one more time, and continuously injecting the supercritical carbon dioxide for the third time, hexamethyldisilazane (HMDS) was introduced in an amount of 5 parts by weight based on 100 parts by weight of the wet gel. When the hexamethyldisilazane was introduced, the solvent extraction rate was 60 wt %. Thereafter, the resting state was maintained for 20 minutes, and then the supercritical carbon dioxide was continuously injected. Thereafter, the pressure was reduced to normal pressure and the supercritical drying was completed. At this time, the supercritical drying took a total of 4 hours. Thereafter, additional normal-pressure drying was performed in an oven at 150° C. to prepare an aerogel composite.

[Comparative Example 3] Preparation of Aerogel Composite

Tetraethyl orthosilicate (TEOS) and water were mixed in a molar ratio of 1:4 and ethanol having a weight ratio of 1:1 with respect to TEOS was added thereto to prepare a silica precursor solution. In order to promote hydrolysis of the silica precursor solution, an acid was added such that the pH of the silica precursor solution was to be 3 or less and stirred for 2 hours or more to prepare a hydrated TEOS solution. Ethanol having a weight ratio of 1:2.05 with respect to the hydrated TEOS solution was added to prepare a silica sol. Thereafter, the prepared aerogel powder was added to the prepared silica sol in an amount of 3 parts by weight based on 100 parts by weight of silica in the silica sol. A base catalyst solution (5 wt % of NaOH aqueous solution) having a volume ratio of 99:1 with respect to the obtained silica sol was added to prepare a catalyzed sol. After filling the catalyzed sol in an impregnation tank, a fiber substrate (glass fiber mat, 5 mm) was impregnated with the catalyzed sol. The fiber substrate which passed through the impregnation tank to allow the catalyzed sol to infiltrate thereinto was gelled while moving on a conveyor belt at a predetermined rate. At this time, the ambient atmosphere temperature at the top of the conveyor belt was maintained at 25° C. The prepared wet gel composite was put into a supercritical extractor, and then the temperature was raised to 70° C. and the pressure was raised to 150 bar, and the raised temperature was maintained for 20 minutes. Thereafter, supercritical carbon dioxide was continuously injected for 20 minutes to extract the solvent, which was left at rest (left to stand) for 20 minutes. After repeating the supercritical carbon dioxide injection and the resting one more time, and continuously injecting the supercritical carbon dioxide for the third time, hexamethyldisilazane (HMDS) was introduced in an amount of 3 parts by weight based on 100 parts by weight of the wet gel. When the hexamethyldisilazane was introduced, the solvent extraction rate was 70 wt %. Thereafter, the resting state was maintained for 20 minutes, and then the supercritical carbon dioxide was continuously injected. Thereafter, the pressure was reduced to normal pressure and the supercritical drying was completed. At this time, the supercritical drying took a total of 4 hours. Thereafter, additional normal-pressure drying was performed in an oven at 150° C. to prepare an aerogel composite.

[Comparative Example 4] Preparation of Aerogel Composite

Tetraethyl orthosilicate (TEOS) and water were mixed in a molar ratio of 1:4 and ethanol having a weight ratio of 1:1 with respect to TEOS was added thereto to prepare a silica precursor solution. In order to promote hydrolysis of the silica precursor solution, an acid was added such that the pH of the silica precursor solution was to be 3 or less and stirred for 2 hours or more to prepare a hydrated TEOS solution. Ethanol having a weight ratio of 1:2.6 with respect to the hydrated TEOS solution was added to prepare a silica sol. A base catalyst solution (5 wt % of NaOH aqueous solution) having a volume ratio of 99:1 with respect to the obtained silica sol was added to prepare a catalyzed sol. After filling the catalyzed sol in an impregnation tank, a fiber substrate (glass fiber mat, 5 mm) was impregnated with the catalyzed sol at a volume ratio of 1:1. The fiber substrate which passed through the impregnation tank to allow the catalyzed sol to infiltrate thereinto was gelled while moving on a conveyor belt at a predetermined rate. At this time, the ambient atmosphere temperature at the top of the conveyor belt was maintained at 25° C. The wet gel composite was added with 80 vol % of a hexamethyldisilazane (HMDS)/ethanol solution (volume ratio of 1:19) as a surface modifier based on the volume of the wet gel composite, and then was subjected to surface modification at a temperature of 70° C. for 4 hours. After the surface modification was completed, the wet gel composite was placed in a 70 L supercritical extractor and $CO_2$ was continuously injected thereto at 28° C. and 70 bar for 10 minutes at a rate of 70 L/min. Thereafter, the temperature inside the extractor was raised to 50° C. over the course of 1 hour and 20 minutes, and upon reaching 50° C. and 150 bar, $CO_2$ was continuously injected thereto for 20 minutes at a rate of 5 L/min. At this time, ethanol was recovered through the bottom of a separator. After 20 minutes of resting, supercritical drying was performed by continuously injecting $CO_2$ at a rate of 5 L/min over the course of 20 minutes. Thereafter, $CO_2$ was vented over the course of 2 hours to prepare a silica aerogel composite.

[Comparative Example 5] Preparation of Aerogel Composite

Tetraethyl orthosilicate (TEOS) and water were mixed in a molar ratio of 1:4 and ethanol having a weight ratio of 1:1 with respect to TEOS was added thereto to prepare a silica precursor solution. In order to promote hydrolysis of the silica precursor solution, an acid was added such that the pH of the silica precursor solution was to be 3 or less and stirred for 2 hours or more to prepare a hydrated TEOS solution. Ethanol having a weight ratio of 1:3.4 with respect to the hydrated TEOS solution was added to prepare a silica sol. A base catalyst solution (5 wt % of NaOH aqueous solution) having a volume ratio of 99:1 with respect to the obtained silica sol was added to prepare a catalyzed sol. After filling the catalyzed sol in an impregnation tank, a fiber substrate (glass fiber mat, 5 mm) was impregnated with the catalyzed sol at a volume ratio of 1:1. The fiber substrate which passed through the impregnation tank to allow the catalyzed sol to infiltrate thereinto was gelled while moving on a conveyor belt at a predetermined rate. At this time, the ambient atmosphere temperature at the top of the conveyor belt was maintained at 20° C. The wet gel composite was added with 80 vol % of a hexamethyldisilazane (HMDS)/ethanol solution (volume ratio of 1:19) as a surface modifier based on the volume of the wet gel composite, and then was subjected to surface modification at a temperature of 70° C. for 4 hours. After the surface modification was completed, the wet gel composite was placed in a 70 L supercritical extractor and $CO_2$ was continuously injected thereto at 28° C. and 70 bar for 10 minutes at a rate of 70 L/min. Thereafter, the temperature inside the extractor was raised to 50° C. over the course of 1 hour and 20 minutes, and upon reaching 50° C. and 150 bar, $CO_2$ was continuously injected thereto for 20 minutes at a rate of 5 L/min. At this time, ethanol was recovered through the bottom of a separator. After 20 minutes of resting, supercritical drying was performed by continuously injecting $CO_2$ at a rate of 5 L/min over the course of 20 minutes. Thereafter, $CO_2$ was vented over the course of 2 hours to prepare a silica aerogel composite.

[Experimental Example 1] Volume Ratio of Fibers and Remaining Portion Per Unit Volume of Aerogel Composite The following experiment was performed on the silica aerogel composite prepared in each of Examples 1 to 5 and Comparative Examples 1 to 5, which were finally dried as described above, to confirm a volume ratio of the fibers and the remaining portion, that is, voids between the aerogel including pores and discrete fibers.

First, aerogel composites of Examples 1 to 5 and Comparative Examples 1 to 5 prepared to have a width×length of approximately 60 cm×12 cm and a height of approximately 0.4 cm were prepared, and five rectangular parallelepiped specimens each having a size of width×length of 1 cm×1 cm were obtained from each of the aerogel composites. However, at this time, the five specimens were obtained by obtaining four specimens by positioning a position, which is spaced apart by 10 cm in a center direction from each corner of the aerogel composite, and obtaining one specimen by positioning the exact central portion of the aerogel composite at the exact center of a specimen.

Figure 2:
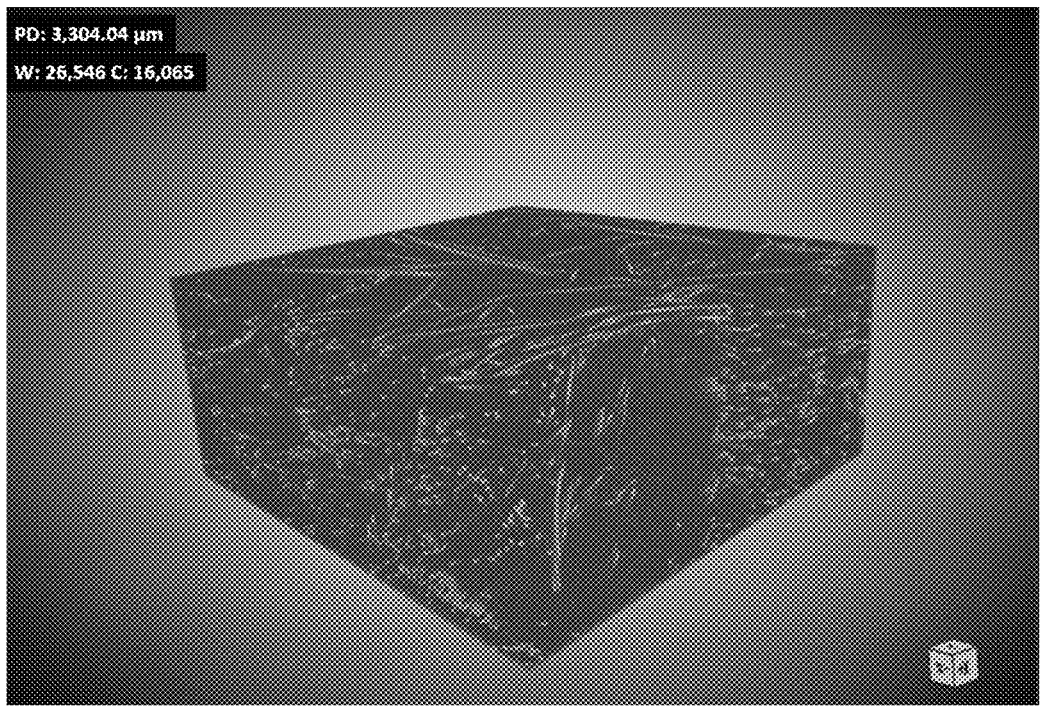
FIG. 2 illustrates an example process of distinguishing the fibers and the remaining portion other than the fibers in the segmented region by contrast level using Dragonfly software.
Figure 3:
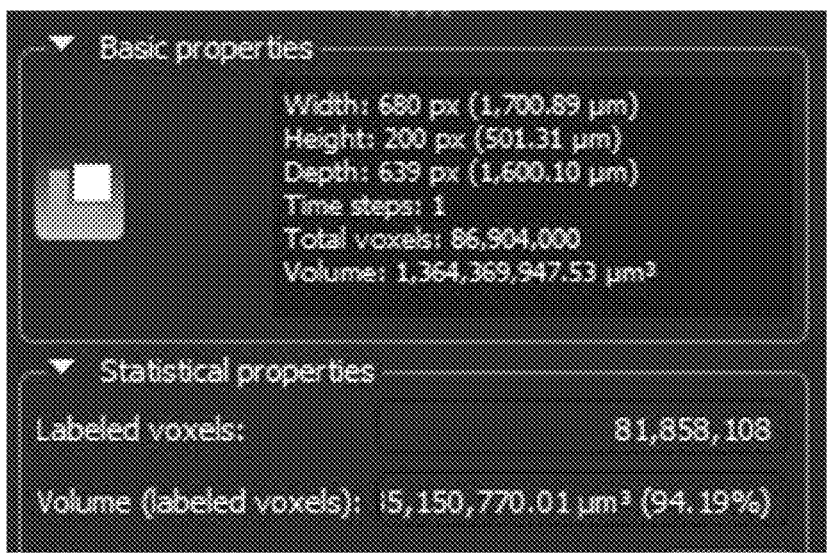
FIG. 3 illustrates an example process of calculating the volume occupancy ratio (volume ratio) of each of the fibers and the remaining portion other than the fibers using Dragonfly software.

Thereafter, the specimen is placed in a load cell by DEBEN Co., followed by assembling the load cell, and a stage portion of the device was changed to a dedicated stage capable of fixing the load cell. At this time, in-situ XRM analysis was performed using the VERSA 520 equipment by ZEISS Co. under the conditions shown in Table 1 below. In order to confirm the volume ratio of the fibers and the aerogel including the voids and the pores in each of the aerogel composite specimens based on the results of the analysis, Dragonfly software (version 2021.3) was used. In order to facilitate understanding, the analysis method will be explained as follows with reference to FIGS. 1 to 3 showing one example process of the analysis. After activating the results of the in-situ XRM analysis with the Dragonfly software, a region to be segmented was set and extracted by adjusting the border through the Clip function (FIG. 1). At this time, the size of the segmentation region was set to be about 1700 μm×1600 μm×500 μm (width×length×height). Within the segmented region, the fibers and the remaining portion other than the fibers were distinguished, based on contrast level, using a lower otsu function and an upper otsu function of the Dragonfly software (FIG. 2). The lower otsu function identified portions of the segmented region with lower contrast, corresponding to the portion other than the fibers, and the upper otsu function identified portions of the segmented region with higher contrast, corresponding to the fibers. The volume occupancy ratio (volume ratio) of the fibers and of the remaining portion other than the fibers was then calculated using the Dragonfly software (FIG. 3). After segmenting the fibers and the remaining portion other than the fibers through a lower otsu function and an upper otsu function, the volume occupancy ratio (volume ratio) of each of the segments was calculated. Through the analysis, average values of volume ratios of the fibers per unit volume of the aerogel composite and volume ratios of the aerogel including pores and voids between discrete fibers, which were measured for each of the five specimens of each of Examples and Comparative Examples, were calculated and shown in Table 2 below.

TABLE 1

| Acceleration voltage | 80 kV |
|---|---|
| Voxel size | 2.5 μm |

TABLE 1-continued

| | |
|---|---|
| Magnification of objective lens | 4X |
| Exposure time | 1 s/frame |
| Number of total frames | 3201 |

TABLE 2

| Classification | Volume ratio (%) of fibers per unit volume of aerogel composite | Volume ratio (%) of remaining portion other than fibers per unit volume of aerogel composite |
|---|---|---|
| Example 1 | 9.7 | 90.3 |
| Example 2 | 7.4 | 92.6 |
| Example 3 | 6.5 | 93.5 |
| Example 4 | 8.8 | 91.2 |
| Example 5 | 8.5 | 91.5 |
| Comparative Example 1 | 22.9 | 77.1 |
| Comparative Example 2 | 13.6 | 86.4 |
| Comparative Example 3 | 15.4 | 84.6 |
| Comparative Example 4 | 23.8 | 76.2 |
| Comparative Example 5 | 25.4 | 74.6 |

As shown in Table 1 above, it can be seen that per unit volume of the silica aerogel composite prepared in each of Examples 1 to 5, the total volume of fibers is 2 vol % to 12 vol %, and the volume ratio of the remaining portion other than the fibers (the aerogel including pores and the voids between discrete fibers) is 88 vol % to 98 vol %.

[Experimental Example 2] Weight Ratio of Fiber Substrate and Aerogel in Aerogel Composite The weight of the silica aerogel composite prepared in each of Examples 1 to 5 and Comparative Examples 1 to 5, which were finally dried as described above, was measured. In addition, the fiber substrate in an amount used in the aerogel composite was weighed after supercritical drying and normal-pressure drying were performed in the same manner as in Comparative Example 1. Assuming the difference between the weight of the silica aerogel composite and the weight of the fiber substrate as the weight of the aerogel, the weight ratio of the fiber substrate and the aerogel in each of Examples and Comparative Examples was calculated and shown in Table 3 below.

TABLE 3

| Classification | Weight ratio of fiber substrate:aerogel |
|---|---|
| Example 1 | 1:0.7 |
| Example 2 | 1:0.6 |
| Example 3 | 1:0.45 |
| Example 4 | 1:0.5 |
| Example 5 | 1:0.5 |
| Comparative Example 1 | 1:0.375 |
| Comparative Example 2 | 1:0.5 |
| Comparative Example 3 | 1:0.375 |
| Comparative Example 4 | 1:0.3 |
| Comparative Example 5 | 1:0.25 |

As shown in Table 3 above, it can be seen that in the silica aerogel composite prepared in each of Examples 1 to 5, the fiber substrate and the aerogel are included in a weight ratio of 1:0.4 to 1.

[Experimental Example 3] Evaluation of Thermal Stability at High Temperatures

In order to evaluate the thermal stability at a high temperature of 350° C. of an aerogel composite prepared according to the present disclosure, the aerogel composite prepared in each of Examples and Comparative Examples was maintained at an isothermal temperature of 350° C. for 1 hour to analyze the weight retention rate of the aerogel composite over time. For the above-described analysis, a specimen having a size of 10 cm×10 cm was obtained from each of the aerogel composites of Examples 1 to 5 and Comparative Examples 1 to 5. Thereafter, the temperature inside a furnace (Changshin Science C-FMD) was raised to 350° C., and then the aerogel composite specimen described above was placed therein and held for 1 hour to measure the weight reduction rate of the specimen relative to the initial weight (150° C., after 1 hour heat-treatment), and the results are shown in Table 4 below. In addition, in order to confirm the degree of variation of weight loss over time, the average value (b) of weight retention rates measured at 5 minutes, 10 minutes, 15 minutes, 20 minutes, 25 minutes, and 30 minutes was calculated, and the difference between the weight retention rate (a) and the average value at each period of time, and the percentage (A) of the difference compared to the average value (b) was calculated and are shown in Table 5 below. However, in Table 5 below, the weight retention rates (a) and the average values (b) are rounded from third decimal places and expressed as second decimal places. The deviation percentages (A) of the weight retention rates are rounded from fifth decimal places and expressed as fourth decimal places.

$$A\ (\%)=\{(\text{Weight retention rate measured after heating for } x \text{ minutes } (a))-(\text{Average value of weight retention rates after heating } (b))\}/(\text{Average value of weight retention rates after heating } (b))\times 100 \qquad \text{[Equation 2]}$$

TABLE 4

| | | (wt %) | |
|---|---|---|---|
| | Duration | Weight retention rate | Weight loss rate |
| Example 1 | 5 minutes (300 seconds) | 98.43 | 1.57 |
| | 10 minutes (600 seconds) | 98.23 | 1.77 |
| | 15 minutes (900 seconds) | 98.15 | 1.85 |
| | 20 minutes (1200 seconds) | 98.09 | 1.91 |

TABLE 4-continued

| | | (wt %) | |
|---|---|---|---|
| | Duration | Weight retention rate | Weight loss rate |
| | 25 minutes (1500 seconds) | 98.05 | 1.95 |
| | 30 minutes (1800 seconds) | 98.02 | 1.98 |
| | 40 minutes (2400 seconds) | 97.96 | 2.04 |
| | 50 minutes (3000 seconds) | 97.91 | 2.09 |
| | 60 minutes (3600 seconds) | 97.88 | 2.12 |
| Example 2 | 5 minutes (300 seconds) | 99.45 | 0.55 |
| | 10 minutes (600 seconds) | 99.34 | 0.66 |
| | 15 minutes (900 seconds) | 99.32 | 0.68 |
| | 20 minutes (1200 seconds) | 99.28 | 0.72 |
| | 25 minutes (1500 seconds) | 99.28 | 0.72 |
| | 30 minutes (1800 seconds) | 99.25 | 0.75 |
| | 40 minutes (2400 seconds) | 99.23 | 0.77 |
| | 50 minutes (3000 seconds) | 99.21 | 0.79 |
| | 60 minutes (3600 seconds) | 99.19 | 0.81 |
| Example 3 | 5 minutes (300 seconds) | 99.26 | 0.74 |
| | 10 minutes (600 seconds) | 99.08 | 0.92 |
| | 15 minutes (900 seconds) | 98.83 | 1.17 |
| | 20 minutes (1200 seconds) | 98.62 | 1.38 |
| | 25 minutes (1500 seconds) | 98.17 | 1.83 |
| | 30 minutes (1800 seconds) | 97.93 | 2.07 |
| | 40 minutes (2400 seconds) | 97.77 | 2.23 |
| | 50 minutes (3000 seconds) | 97.62 | 2.38 |
| | 60 minutes (3600 seconds) | 97.31 | 2.69 |
| Example 4 | 5 minutes (300 seconds) | 98.57 | 1.43 |
| | 10 minutes (600 seconds) | 98.32 | 1.68 |
| | 15 minutes (900 seconds) | 98.26 | 1.74 |
| | 20 minutes (1200 seconds) | 98.18 | 1.82 |
| | 25 minutes (1500 seconds) | 98.02 | 1.98 |
| | 30 minutes (1800 seconds) | 97.89 | 2.11 |
| | 40 minutes (2400 seconds) | 97.73 | 2.27 |
| | 50 minutes (3000 seconds) | 97.57 | 2.43 |
| | 60 minutes (3600 seconds) | 97.40 | 2.60 |
| Example 5 | 5 minutes (300 seconds) | 98.21 | 1.79 |
| | 10 minutes (600 seconds) | 98.12 | 1.88 |
| | 15 minutes (900 seconds) | 98.06 | 1.94 |
| | 20 minutes (1200 seconds) | 97.99 | 2.01 |
| | 25 minutes (1500 seconds) | 97.98 | 2.02 |
| | 30 minutes (1800 seconds) | 97.95 | 2.05 |
| | 40 minutes (2400 seconds) | 97.90 | 2.10 |
| | 50 minutes (3000 seconds) | 97.87 | 2.13 |
| | 60 minutes (3600 seconds) | 97.85 | 2.15 |
| Comparative Example 1 | 5 minutes (300 seconds) | 97.50 | 2.50 |
| | 10 minutes (600 seconds) | 94.66 | 5.34 |
| | 15 minutes (900 seconds) | 93.82 | 6.18 |
| | 20 minutes (1200 seconds) | 93.67 | 6.33 |
| | 25 minutes (1500 seconds) | 93.57 | 6.43 |
| | 30 minutes (1800 seconds) | 93.50 | 6.50 |
| | 40 minutes (2400 seconds) | 93.43 | 6.57 |
| | 50 minutes (3000 seconds) | 93.37 | 6.63 |
| | 60 minutes (3600 seconds) | 93.32 | 6.68 |
| Comparative Example 2 | 5 minutes (300 seconds) | 99.10 | 0.90 |
| | 10 minutes (600 seconds) | 98.23 | 1.77 |
| | 15 minutes (900 seconds) | 97.82 | 2.18 |
| | 20 minutes (1200 seconds) | 97.56 | 2.44 |
| | 25 minutes (1500 seconds) | 96.87 | 3.13 |
| | 30 minutes (1800 seconds) | 95.72 | 4.28 |
| | 40 minutes (2400 seconds) | 94.96 | 5.04 |
| | 50 minutes (3000 seconds) | 94.76 | 5.24 |
| | 60 minutes (3600 seconds) | 94.59 | 5.41 |
| Comparative Example 3 | 5 minutes (300 seconds) | 99.79 | 0.21 |
| | 10 minutes (600 seconds) | 98.51 | 1.49 |
| | 15 minutes (900 seconds) | 97.79 | 2.21 |
| | 20 minutes (1200 seconds) | 97.13 | 2.87 |
| | 25 minutes (1500 seconds) | 96.30 | 3.70 |
| | 30 minutes (1800 seconds) | 95.83 | 4.17 |
| | 40 minutes (2400 seconds) | 95.12 | 4.88 |
| | 50 minutes (3000 seconds) | 94.46 | 5.54 |
| | 60 minutes (3600 seconds) | 94.02 | 5.98 |
| Comparative Example 4 | 5 minutes (300 seconds) | 98.63 | 1.37 |
| | 10 minutes (600 seconds) | 97.46 | 2.54 |
| | 15 minutes (900 seconds) | 97.01 | 2.99 |
| | 20 minutes (1200 seconds) | 96.58 | 3.42 |
| | 25 minutes (1500 seconds) | 96.12 | 3.88 |
| | 30 minutes (1800 seconds) | 94.97 | 5.03 |
| | 40 minutes (2400 seconds) | 94.20 | 5.80 |
| | 50 minutes (3000 seconds) | 93.82 | 6.18 |
| | 60 minutes (3600 seconds) | 92.79 | 7.21 |
| Comparative Example 5 | 5 minutes (300 seconds) | 97.52 | 2.48 |
| | 10 minutes (600 seconds) | 96.98 | 3.02 |
| | 15 minutes (900 seconds) | 96.11 | 3.89 |
| | 20 minutes (1200 seconds) | 95.62 | 4.38 |
| | 25 minutes (1500 seconds) | 95.13 | 4.87 |
| | 30 minutes (1800 seconds) | 94.38 | 5.62 |
| | 40 minutes (2400 seconds) | 93.77 | 6.23 |
| | 50 minutes (3000 seconds) | 93.14 | 6.86 |
| | 60 minutes (3600 seconds) | 92.63 | 7.37 |

TABLE 5

| | | (wt %) | | | |
|---|---|---|---|---|---|
| | Duration | Weight retention rate(a) | Average value(b) | Deviation (a-b) | Deviation percentage (A(%) = (a-b)/b*100) |
| Example 1 | 5 minutes (300 seconds) | 98.43 | 98.16 | 0.27 | 0.2751 |
| | 10 minutes (600 seconds) | 98.23 | | 0.07 | 0.0713 |
| | 15 minutes (900 seconds) | 98.15 | | −0.01 | −0.0102 |
| | 20 minutes (1200 seconds) | 98.09 | | −0.07 | −0.0713 |
| | 25 minutes (1500 seconds) | 98.05 | | −0.11 | −0.1121 |
| | 30 minutes (1800 seconds) | 98.02 | | −0.14 | −0.1426 |
| Example 2 | 5 minutes (300 seconds) | 99.45 | 99.32 | 0.13 | 0.1309 |
| | 10 minutes (600 seconds) | 99.34 | | 0.02 | 0.0201 |
| | 15 minutes (900 seconds) | 99.32 | | 0 | 0.0000 |
| | 20 minutes (1200 seconds) | 99.28 | | −0.04 | −0.0403 |
| | 25 minutes (1500 seconds) | 99.28 | | −0.04 | −0.0403 |
| | 30 minutes (1800 seconds) | 99.25 | | −0.07 | −0.0705 |
| Example 3 | 5 minutes (300 seconds) | 99.26 | 98.65 | 0.61 | 0.6196 |
| | 10 minutes (600 seconds) | 99.08 | | 0.43 | 0.4368 |
| | 15 minutes (900 seconds) | 98.83 | | 0.18 | 0.1828 |
| | 20 minutes (1200 seconds) | 98.62 | | −0.03 | −0.0305 |
| | 25 minutes (1500 seconds) | 98.17 | | −0.48 | −0.4876 |
| | 30 minutes (1800 seconds) | 97.93 | | −0.72 | −0.7313 |

TABLE 5-continued

| | | (wt %) | | | |
|---|---|---|---|---|---|
| | Duration | Weight retention rate(a) | Average value(b) | Deviation (a-b) | Deviation percentage (A(%) = (a-b)/b*100) |
| Example 4 | 5 minutes (300 seconds) | 98.57 | 98.21 | 0.36 | 0.3666 |
| | 10 minutes (600 seconds) | 98.32 | | 0.11 | 0.1120 |
| | 15 minutes (900 seconds) | 98.26 | | 0.05 | 0.0509 |
| | 20 minutes (1200 seconds) | 98.18 | | −0.03 | −0.0305 |
| | 25 minutes (1500 seconds) | 98.02 | | −0.19 | −0.1935 |
| | 30 minutes (1800 seconds) | 97.89 | | −0.32 | −0.3258 |
| Example 5 | 5 minutes (300 seconds) | 98.21 | 98.05 | 0.16 | 0.1632 |
| | 10 minutes (600 seconds) | 98.12 | | 0.07 | 0.0714 |
| | 15 minutes (900 seconds) | 98.06 | | 0.01 | 0.0102 |
| | 20 minutes (1200 seconds) | 97.99 | | −0.06 | −0.0612 |
| | 25 minutes (1500 seconds) | 97.98 | | −0.07 | −0.0714 |
| | 30 minutes (1800 seconds) | 97.95 | | −0.1 | −0.1020 |
| Comparative Example 1 | 5 minutes (300 seconds) | 97.50 | 94.45 | 3.05 | 3.2292 |
| | 10 minutes (600 seconds) | 94.66 | | 0.21 | 0.2223 |
| | 15 minutes (900 seconds) | 93.82 | | −0.63 | −0.6670 |
| | 20 minutes (1200 seconds) | 93.67 | | −0.78 | −0.8258 |
| | 25 minutes (1500 seconds) | 93.57 | | −0.88 | −0.9317 |
| | 30 minutes (1800 seconds) | 93.50 | | −0.95 | −1.0058 |
| Comparative Example 2 | 5 minutes (300 seconds) | 99.10 | 97.55 | 1.55 | 1.5889 |
| | 10 minutes (600 seconds) | 98.23 | | 0.68 | 0.6971 |
| | 15 minutes (900 seconds) | 97.82 | | 0.27 | 0.2768 |
| | 20 minutes (1200 seconds) | 97.56 | | 0.01 | 0.0103 |
| | 25 minutes (1500 seconds) | 96.87 | | −0.68 | −0.6971 |
| | 30 minutes (1800 seconds) | 95.72 | | −1.83 | −1.8760 |
| Comparative Example 3 | 5 minutes (300 seconds) | 99.79 | 97.56 | 2.23 | 2.2858 |
| | 10 minutes (600 seconds) | 98.51 | | 0.95 | 0.9738 |
| | 15 minutes (900 seconds) | 97.79 | | 0.23 | 0.2358 |
| | 20 minutes (1200 seconds) | 97.13 | | −0.43 | −0.4408 |
| | 25 minutes (1500 seconds) | 96.30 | | −1.26 | −1.2915 |
| | 30 minutes (1800 seconds) | 95.83 | | −1.73 | −1.7733 |
| Comparative Example 4 | 5 minutes (300 seconds) | 98.63 | 96.80 | 1.83 | 1.8905 |
| | 10 minutes (600 seconds) | 97.46 | | 0.66 | 0.6818 |
| | 15 minutes (900 seconds) | 97.01 | | 0.21 | 0.2169 |
| | 20 minutes (1200 seconds) | 96.58 | | −0.22 | −0.2273 |
| | 25 minutes (1500 seconds) | 96.12 | | −0.68 | −0.7025 |
| | 30 minutes (1800 seconds) | 94.97 | | −1.83 | −1.8905 |
| Comparative Example 5 | 5 minutes (300 seconds) | 97.52 | 95.96 | 1.56 | 1.6257 |
| | 10 minutes (600 seconds) | 96.98 | | 1.02 | 1.0629 |
| | 15 minutes (900 seconds) | 96.11 | | 0.15 | 0.1563 |
| | 20 minutes (1200 seconds) | 95.62 | | −0.34 | −0.3543 |
| | 25 minutes (1500 seconds) | 95.13 | | −0.83 | −0.8649 |
| | 30 minutes (1800 seconds) | 94.38 | | −1.58 | −1.6465 |

As shown in Tables 4 and 5 above, the aerogel composites (Examples 1 to 5) according to the present disclosure had a small weight loss rate of the specimen after 5 minutes at a high temperature of 350° C., and had little weight change over time, and the weight retention rate was more than 97 wt %, and the weight loss rate was only less than 3 wt % even after a long period of time of 60 minutes. In addition, it can be seen that the weight retention rate of the aerogel composite according to the present disclosure was maintained almost constant over a period of time from a relatively short time of 5 minutes to a relatively long time of 30 minutes.

However, the aerogel composites of Comparative Examples 1 to 5 showed a pattern in that the weight of each of the aerogel composites continuously decreased for 60 minutes during the analysis, and the weight loss rate was significantly greater than that of Examples. In addition, it can be seen that the weight of the aerogel composites of Comparative Examples 1 to 5 fluctuated with a large deviation over a period of time from 5 minutes to 30 minutes.

[Experimental Example 4] Evaluation of Surface and Cross-Section Water Repellency The following experiments were performed to evaluate the degree of hydrophobicity on the surface and inside of the aerogel composite.

1. Measurement of Surface Water Repellency

First, a specimen having a size of 10 cm×10 cm (the thickness is about 4 mm, which is the thickness of the aerogel composite) was obtained from each of the aerogel composites of Examples 1 to 5 and Comparative Examples 1 to 5, and floated on distilled water at a temperature of 21±2° C., and then, a 6.4 mm mesh screen sank to 127 mm below the surface of the water (impregnation). 15 minutes later, the mesh screen was removed, and when the specimen rose to the surface, the specimen was picked up with a clamp and was hung vertically for 60±5 seconds. Thereafter, the weight of the specimens before/after the impregnation were each measured to calculate the surface water repellency according to Equation 4 below. The lower the surface water repellency, the better the degree of hydrophobicity on the surface of the silica aerogel composite.

Moisture impregnation rate (wt %)={(Weight of specimen after impregnation−Weight of specimen before impregnation)/(Weight of specimen before impregnation)}×100   [Equation 4]

2. Measurement of Cross-Section Water Repellency

The cross-section water repellency was measured in the same manner as the surface water repellency after cutting a specimen having a size of 10 cm×10 cm into a size of 1 cm×1 cm (the thickness thereof is about 4 mm, which is the thickness of the aerogel composite). However, in consideration of the size of the specimens, the cross-section water repellency was represented as an average value after preparing five specimens for each of Examples and Comparative Examples and repeating the same experiment for each specimen. At this time, the average value was rounded from the third decimal place and expressed to two decimal place. Here, the lower the cross-section water repellency value, the better the degree of hydrophobicity inside the silica aerogel composite.

TABLE 6

|  | Surface water repellency (%) | Cross-section water repellency (%) |
|---|---|---|
| Example 1 | 1.18 | 0.76 |
| Example 2 | 0.75 | 0.51 |
| Example 3 | 3.54 | 1.13 |
| Example 4 | 3.21 | 1.15 |
| Example 5 | 3.6 | 1.13 |
| Comparative Example 1 | 4.89 | 3.75 |
| Comparative Example 2 | 4.45 | 2.73 |
| Comparative Example 3 | 5.64 | 3.16 |
| Comparative Example 4 | 9.51 | 5.51 |
| Comparative Example 5 | 11.01 | 6.13 |

As shown in Table 6 above, it can be seen that the surface water repellency of the aerogel composites of Examples 1 to 5 according to the present disclosure is approximately 4 wt % or less, which is low, and the cross-section water repellency is also very low at 1.5 wt % or less. From the above, it can be seen that the aerogel composite according to the present disclosure has a high degree of hydrophobicity both on the surface and the inside, and has excellent water repellency.

On the contrary, it can be seen that the surface water repellency of the aerogel composites of Comparative Examples 1 to 5 is at a level of greater than 4 wt %, and the cross-section water repellency thereof is at a minimum of 2.73 wt % and at a maximum of 6.13 wt %, indicating very low water repellency, and the degree of hydrophobicity inside the aerogel composite is particularly low.

[Experimental Example 5] Evaluation of Heat Insulation

In order to evaluate the room-temperature thermal conductivity of the aerogel composite prepared according to the present disclosure, the room-temperature thermal conductivity of the aerogel composite having a size of 60 cm×12 cm prepared in each of Examples and Comparative Examples was measured using the HFM436 equipment by Netzsch Co., and the results are shown in Table 7 below.

In addition, in order to evaluate the thermal conductivity at high temperatures, the guarded hot plate (GHP) high-temperature thermal conductivity of the aerogel composite prepared in each of Examples and Comparative Examples was measured at a temperature of approximately 150° C. using the GHP 456 equipment by NETZSCH Co., and the results are shown in Table 7 below.

TABLE 7

| Classification | Room-temperature thermal conductivity (mW/mK) | High-temperature thermal conductivity (mW/mK) |
|---|---|---|
| Example 1 | 20.8 | 23.8 |
| Example 2 | 20.5 | 23.5 |
| Example 3 | 18.5 | 21.3 |
| Example 4 | 17.9 | 21.1 |
| Example 5 | 18.7 | 22.0 |
| Comparative Example 1 | 21.1 | 24.7 |
| Comparative Example 2 | 20.9 | 24.1 |
| Comparative Example 3 | 21.3 | 24.2 |
| Comparative Example 4 | 23.2 | 26.2 |
| Comparative Example 5 | 25.9 | 29.7 |

As shown in Table 7 above, it can be seen that the aerogel composites of Examples 1 to 5 according to the present disclosure have excellent heat insulation at both room temperature and high temperatures compared to the aerogel composites of Comparative Examples 1 to 5.

[Example 6] Preparation of Heat Insulation Member

To both surfaces of the aerogel composite prepared in each of Examples 1 to 5, a ALKYN-1505(C) product by ALKYNES Co., in which a 25 μm-thick acrylic adhesive was applied to one surface of a 25 μm-thick PET film, was attached to prepare a heat insulation member.

[Example 7] Preparation of Heat Insulation Member

To both surfaces of the aerogel composite prepared in each of Examples 1 to 5, a ALKYN-4005 (FR) product by ALKYNES Co., in which a 25 μm-thick acrylic adhesive was applied to one surface of a 25 μm-thick flame retardant PET film, was attached to prepare a heat insulation member.

[Example 8] Preparation of Heat Insulation Member

On both surfaces of the aerogel composite prepared in each of Examples 1 to 5, a 7 μm-thick polyester film and a 12 μm-thick PET film were sequentially stacked, and to the other surface of the polyester film, a ALKYN-4004D (PS) product by ALKYNES Co. to which a 25 μm-thick acrylic adhesive was applied, was attached to prepare a heat insulation member.

An aerogel composite provided in the present disclosure has excellent high-temperature thermal stability, and thus, even when exposed to a high-temperature environment for a long period of time, the degree of decomposition or loss of aerogel components is not large, and the amount of change in weight over time at high temperatures is small, so that the thermal stability may be maintained at an excellent level.

What is claimed is:

1. An aerogel composite comprising:
a fiber substrate including a plurality of discrete fibers and voids between the fibers; and
silica aerogel including a plurality of aerogel particles positioned on the fibers or in the voids between the fibers, and having a network structure including one or more pores,
wherein:
a weight retention rate measured after heating the aerogel composite at a temperature of 350° C. for 60 minutes is 96% or greater, and
a weight retention rate measured after heating the aerogel composite at a temperature of 350° C. for each of 5 minutes, 10 minutes, 15 minutes, 20 minutes, 25 minutes, er and 30 minutes satisfies Equation 2 below:

$$A\ (\%) = \{(\text{Weight retention rate measured after heating for } x \text{ minutes } (a)) - (\text{Average value of weight retention rates after heating } (b))\}/(\text{Average value of weight retention rates after heating } (b)) \times 100 \quad [\text{Equation 2}]$$

wherein in the Equation 2 above:
the x minutes is 5 minutes, 10 minutes, 15 minutes, 20 minutes, 25 minutes, or 30 minutes;
the weight retention rate measured after heating for the x minutes (a) is a percentage (%) of a weight of the aerogel composite measured after heating the aerogel composite at a temperature of 350° C. for the x minutes with respect to a weight of the aerogel composite at 350° C. before the heating;
an average value (b) of weight retention rates after the heating is an average value of weight retention rates obtained after heating the aerogel composite at a temperature of 350° C. for each of 5 minutes, 10 minutes, 15 minutes, 20 minutes, 25 minutes, and 30 minutes; and
A is a real number of −1.0 to +1.0
wherein a volume ratio of the fibers per unit volume of the aerogel composite is 2% to 12% and a volume ratio of the aerogel including pores and the voids between the discrete fibers per unit volume of the aerogel composite is 88% to 98%.

2. The aerogel composite of claim 1, wherein A is a real number of −0.80 to +0.80.

3. The aerogel composite of claim 1, wherein the weight retention rate measured after heating the aerogel composite at a temperature of 350° C. for 30 minutes is 97% or greater.

4. The aerogel composite of claim 1, wherein, when the aerogel composite is heated at a temperature of 350° C. for each of 5 minutes and 60 minutes, an absolute value (B) of change in weight retention rate of the aerogel composite per unit time satisfies Equation 3 below:

$$B = |\{(\text{Weight retention rate measured after heating for } y \text{ minutes}) - (\text{Weight retention rate measured after heating for } z \text{ minutes})\}/(y-z)| \quad [\text{Equation 3}]$$

wherein in the Equation 3 above:
y is 5 minutes, and z is 60 minutes;
a weight retention rate measured after heating for the y minutes is a percentage (%) of the weight of the aerogel composite measured after heating the aerogel composite at a temperature of 350° C. for the y minutes with respect to the weight of the aerogel composite at 350° C. before the heating;
a weight retention rate measured after heating for the z minutes is a percentage (%) of the weight of the aerogel composite measured after heating the aerogel composite at a temperature of 350° C. for the z minutes with respect to the weight of the aerogel composite at 350° C. before the heating; and
B is a real number of $1.0 \times 10^{-3}$ to $7.0 \times 10^{-2}$.

5. The aerogel composite of claim 1, wherein the volume ratio of the fibers per unit volume of the aerogel composite is 5% to 10%, and the volume ratio of the aerogel including pores and the voids between the discrete fibers per unit volume of the aerogel composite is 90% to 95%.

6. The aerogel composite of claim 1, wherein the fiber substrate in the aerogel composite and the silica aerogel are included in a weight ratio of 1:0.4 to 2.

7. The aerogel composite of claim 1, wherein the silica aerogel comprises silica, methylsilylated silica, dimethylsilylated silica, trimethylsilylated silica, or a mixture thereof.

8. The aerogel composite of claim 1, wherein the aerogel composite has a moisture impregnation rate (wt %) of 4 wt % or less with respect to a specimen having a size of 100 mm×100 mm and represented by Equation 4 below:

$$\text{Moisture impregnation rate (wt \%)} = \{(\text{Weight of specimen after impregnation} - \text{Weight of specimen before impregnation})/(\text{Weight of specimen before impregnation})\} \times 100 \quad [\text{Equation 4}]$$

wherein in the Equation 4 above,
a weight of a specimen after impregnation is the weight measured after impregnating an aerogel composite specimen in distilled water at 21±2° C. for 15 minutes.

9. The aerogel composite of claim 1, wherein the aerogel composite has a moisture impregnation rate (wt %) of 2 wt % or less with respect to a specimen having a size of 10 mm×10 mm and represented by Equation 4 below:

$$\text{Moisture impregnation rate (wt \%)} = \{(\text{Weight of specimen after impregnation} - \text{Weight of specimen before impregnation})/(\text{Weight of specimen before impregnation})\} \times 100 \quad [\text{Equation 4}]$$

wherein in the Equation 4 above,
a weight of a specimen after impregnation is the weight measured after impregnating an aerogel composite specimen in distilled water at 21±2° C. for 15 minutes.

10. A heat insulation member comprising the aerogel composite of claim 1.

11. The heat insulation member of claim 10, wherein the heat insulation member further comprises a support member positioned on at least one surface of an upper surface of the aerogel composite and a lower surface thereof.

12. A battery module comprising a module case having an internal space, one or more battery cells positioned within the internal space, and the aerogel composite of claim 1 positioned within the internal space.

13. A battery pack comprising the battery module of claim 12.

* * * * *